US006944799B1

(12) United States Patent
Seeley et al.

(10) Patent No.: US 6,944,799 B1
(45) Date of Patent: Sep. 13, 2005

(54) MULTIMEDIA SYNCHRONIZATION SYSTEM

(75) Inventors: Albert Robinson Seeley, Burlington, MA (US); Steven Todd Sigel, North Andover, MA (US); Douglas Carter Williams, Acton, MA (US)

(73) Assignee: Empirix Inc., Bedford, MA (US)

( * ) Notice: Subject to any disclaimer, the term of this patent is extended or adjusted under 35 U.S.C. 154(b) by 578 days.

(21) Appl. No.: 10/099,819

(22) Filed: Mar. 15, 2002

Related U.S. Application Data

(60) Provisional application No. 60/344,890, filed on Dec. 31, 2001.

(51) Int. Cl.[7] .............................................. G06F 11/00
(52) U.S. Cl. ........................... 714/47; 714/37; 714/55; 379/265.02
(58) Field of Search .............................. 714/37, 38, 47, 714/55; 379/265.01, 265.02, 27.01, 27.04, 379/265.06, 265.08, 266.06, 900, 901; 709/203

(56) References Cited

U.S. PATENT DOCUMENTS

| | | | |
|---|---|---|---|
| 5,572,570 A | 11/1996 | Kuenzig | |
| 5,617,471 A | 4/1997 | Rogers et al. | |
| 5,633,909 A | 5/1997 | Fitch | |
| 5,644,619 A | 7/1997 | Faaris et al. | |
| 5,740,233 A | 4/1998 | Cave et al. | |
| 5,822,401 A | 10/1998 | Cave et al. | |
| 5,854,889 A * | 12/1998 | Liese et al. ................. 714/43 |
| 6,101,617 A | 8/2000 | Bruckhartt et al. | |
| 6,137,870 A | 10/2000 | Scherer | |
| 6,185,290 B1 | 2/2001 | Shaffer et al. | |
| 6,279,826 B1 | 8/2001 | Gill et al. | |
| 6,292,909 B1 | 9/2001 | Hare | |
| 6,324,492 B1 * | 11/2001 | Rowe ........................ 703/13 |
| 6,446,120 B1 * | 9/2002 | Dantressangle ............ 709/224 |
| 6,493,447 B1 * | 12/2002 | Goss et al. ............ 379/265.09 |
| 6,799,213 B1 * | 9/2004 | Zhao et al. ................. 709/224 |
| 6,826,259 B2 * | 11/2004 | Hoffman .................. 379/10.03 |

OTHER PUBLICATIONS

Reference Manual; Multimedia Synchronization Server Reference Guide Release 1.0.0; Document 565-016-05 Revision A, Sep. 2001; pp. 1-43.
Presentation "Multimedia Synchronization Server"—a set of marketing slides which was available to a limited set of customers in Jul. 2001.
Presentation "Multimedia Test Ensemble" —an Empirix User Group Conference presentation delivered Oct. 2001.
Presentation "Best Practices—Implementing End-To-End CTI Testing" —Empirix User Group Conference presentation delivered Oct. 2001.

* cited by examiner

*Primary Examiner*—Robert Beausoliel
*Assistant Examiner*—Aaron Matthew
(74) *Attorney, Agent, or Firm*—Chapin & Huang, LLC; David W. Rouille, Esq.

(57) ABSTRACT

An multimedia synchronization services system has been provided that can synchronize input actions and test data measurements associated with activities of a client/server computer system. The system can be applied to virtual test systems coupled to a contact center to provide time latency measurements between input actions to the calling center and resulting contact center functions.

26 Claims, 16 Drawing Sheets

MULTIMEDIA SYNCHRONIZATION SYSTEM

CROSS REFERENCE TO RELATED APPLICATIONS

This application claims priority under 35 U.S.C. § 119(e) to provisional patent application Ser. No. 60/344,890 filed Dec. 31, 2001 which application is hereby incorporated herein by reference in its entirety.

STATEMENT REGARDING FEDERALLY SPONSORED RESEARCH

Not Applicable.

FIELD OF THE INVENTION

This invention relates generally to client/server computer systems and more particularly to synchronization of test client computers and associated test systems as an integrated test system coupled to a contact center.

BACKGROUND OF THE INVENTION

Conventional client/server computer systems provide a coupling between a server computer and one or more client computers. In such systems, the server computer is provided having server based application programs and a server based storage area that can be used by the one or more client computers. A client computer can access the server based application programs, for example a word processor program, that resides upon the server computer. The client computer can save data, for example a word processor document, to the server based storage area, and can also retrieve the word processor document from the server based storage area.

The client computers coupled to the server computer can also contain client based application programs and a client based storage area local to the client computer. A typical client/server computer system has both server based and client based application programs and storage areas. In general, application programs and storage areas that are to be used by more than one client computer are provided in association with the server computer. Conversely, application programs and storage areas that are used by only one client computer are generally provided in association with the one client computer.

Conventional client/server computer systems can be provided having client and server computers coupled with a variety of connections. When the computers are in relatively close proximity, the connections can be direct wire connections, or radio link connections. When the computers are remote from each other, the connections can include telephone wires, cable TV (CATV) wires, and/or satellite links. There is no limitation as to the physical separation of any of the computers of a client/server computer system.

Conventional client/server computer systems can be provided having client and server computers coupled with a variety of electronic communication protocols. For example, TCP/IP is know to be a communication protocol that can send computer information over any of the connections mentioned above, without limitation as to physical separation. Other protocols, for example Ethernet, can control the distribution of TCP/IP information around a local area network (LAN) of computers.

It will be recognized that conventional client/server systems having one or more "test client computers" that perform test functions provide no synchronization of data between the one or more test client computers. For example, in one illustrative system, a first test client computer can perform a program that expects to find test data from a Test 1 in the server based storage area. The server based storage area can contain data from many tests, including data from the Test 1. Alternatively, the server based storage area can contain no data from the Test 1. In either case, no mechanism is provided by the conventional client/server computer system that allows the first test client computer to either identify the requested data, here data from the Test 1, from among the various data, or to identify an absence of such data.

Computers have been applied as test computers associated with contact centers. Contact centers will be recognized as those systems to which a person can communicate to receive information. Such communication can include, but is not limited to, telephone calls, internet access, email, and FAX.

A contact center can include one or more interactive voice response systems (IVR). The one or more IVRs provide automatic branching voice queries to which the caller responds with button pushes on a telephone keypad or with voice responses on a telephone. The contact center is provided having only the one or more IVR systems, or alternatively, it is also provided having human agents. For example, at the end of the IVR branching voice queries, the caller is directed to press zero to speak to an agent. The agent is a person having a telephone to talk to the caller, hereafter referred to as an "agent telephone," and a computer to access information about the caller, hereafter referred to as an "agent computer." Note that though the agent telephone and the agent computer are often associated with one person, they correspond to distinct electronic systems and will be separately referred to herein.

The contact center can also include one or more database server computers, one or more database storage areas, one or more web server computers, one or more email server computers.

Various testing systems have been provided to test functions associated with the contact center. For example, the HammerIT™ from Empirix, Inc. of Waltham, Mass., can be used to simulate telephone callers in a public switched telephone network (PSTN) having one or more telephone callers who access the contact center either sequentially or in parallel. The HammerIT™ system provides a "virtual telephone caller system" having "virtual telephone callers" that can exercise and test the responses of the one or more IVR systems. The virtual telephone caller system can also be used to test the agent telephone functions of the contact center, providing a "virtual agent telephone system" having "virtual agent telephones." The virtual telephone caller system can also be used to test FAX functions of the contact center.

Various testing systems have also been provided to test the agent computer function of the contact center. For example, the E-test™ system from the Empirix Inc. can be used to simulate the computer functions of the agent computer, providing a "virtual agent computer system" having "virtual agent computers." The E-test™ system can also provide a "virtual web user system" having "virtual web users" that include simulations of people who access web pages on a web server within the contact center, people who send/receive email associated with an email server within the contact center, and people who send/receive FAX information associated with a FAX system within the contact center. The virtual telephone caller systems, virtual agent telephone systems, virtual agent computer systems, and virtual web user systems will hereafter be referred to as "virtual test systems." The overall prior art system is shown below in association with FIG. 1.

Though virtual test systems have been provided to test a contact center, there has been no ability to synchronize the various virtual test systems. Synchronization can provide useful test information not otherwise provided. In particular, latency time measurements between an "action" provided by a first virtual test system, and a measurement of a contact center "function" provided by a second virtual test system could provide useful information to a contact center designer or contact center manager.

It would, therefore, be desirable to provide a system that can synchronize the operation of a variety of test client computers. It would be further desirable to provide a system that can synchronize the operations of a variety of virtual test systems coupled to a contact center.

SUMMARY OF THE INVENTION

The present invention provides a multimedia synchronization system having the ability to synchronize the operation of a variety of test client computers associated with virtual test systems to measure contact center response times. While the invention will be shown and described as limited to one server computer and four client computers, it is understood that the invention can include any number of server computers and any number of test client computers. Also, while the invention is shown and described having certain computer instructions with particular syntax, it is understood that any number of computer instructions with any syntax are possible with this invention.

In accordance with the present invention, a multimedia synchronization system includes a multimedia synchronization server (MSS), and one or more test client computers coupled to the MSS that can generate requests to the MSS. The requests can be "logically related," and logically related requests can be associated together with a "key" value. The logically related requests can be further associated together with a "number of clients" value.

Each of the one or more test client computers is coupled to a respective virtual test system, for example, a virtual telephone caller system, a virtual agent telephone system, a virtual agent computer system, and a web user system. The virtual test systems are coupled to a contact center.

In accordance with another aspect of the present invention, the multimedia synchronization system provides a method that includes generating requests from the one or more test client computers to the synchronization server. The method includes logically relating the requests. The logically related requests are further associated with the key values. The logically related requests can be further associated with the number of clients value.

The method further includes generating actions with at least one virtual test system coupled to the one or more test client computers and coupled to the contact center.

In accordance with yet another aspect of the present invention, the multimedia synchronization system provides a computer product including a computer useable medium having computer readable program code embodied therein with instructions for generating the requests from the one or more test client computers to the synchronization server. The computer product also includes instructions for logically relating the requests, to provide the logically related requests, instructions for further associating the logically related requests with the associated key values. The computer product can also include instructions for further associating the logically related request with the number of clients value.

The computer product further includes instructions for generating actions with at least one virtual test system coupled to the one or more test client computers and coupled to the contact center.

With this particular arrangement, requests from one virtual test system that correspond to input actions to a calling center can be synchronized with requests from another virtual test system that correspond to measured functions of the calling center. The multimedia synchronization system can generate measurements of contact center time latency values corresponding to time periods between input actions and measured functions.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the multimedia synchronization system, some introductory concepts and terminology are explained. As used herein, the term "action" will be used to describe human activities that provide "contact center actions" to a contact center. An action can be provided by a variety of virtual test systems described below. The term "contact center function" will be used herein to describe electronic activities provided by the contact center, for example a data retrieval.

As used herein, the term "virtual telephone callers" is used to describe simulated telephone callers provided by a "virtual telephone caller system" that generates simulated telephone signals corresponding to a public switched telephone network (PSTN). The term "virtual web users" is used to describe simulated web page users provided by a "virtual web user system" that generates simulated internet signals corresponding to the internet. The term "agent" will be used herein to describe a person at a contact center who responds to a telephone caller. The term "virtual agent telephone" is used herein to describe a simulation of the verbal responses of an agent at a contact center, provided by a "virtual agent telephone system." The term "virtual agent computer" is used herein to describe a simulation of the computer display provided to the agent at a contact center, provided by a "virtual agent computer system."

Figure 1:
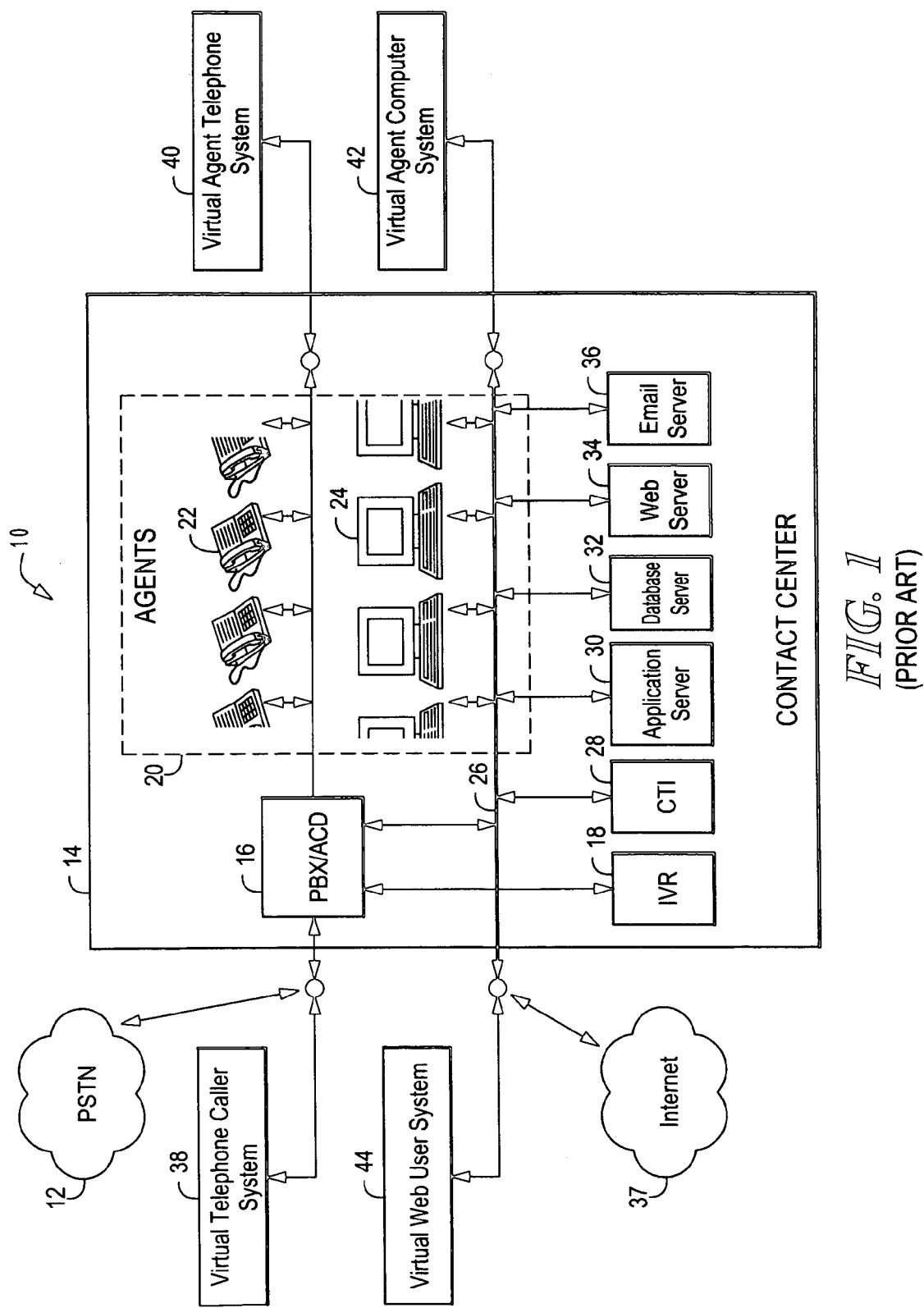
FIG. 1 is a block diagram of a prior art contact center having conventional virtual test systems coupled thereto.

Referring now to FIG. 1, a prior art contact center and test system 10 is connected to the public switched telephone network 12 (PSTN). The PSTN will be recognized to be the worldwide telephone system that provides telephone call connections, including telephone connections to a contact center 14. The contact center 14 can include a private branch exchange 16 (PBX) usually combined with an automatic call distributor 16 (ACD). The PBX 16 will be recognized to be a sub-system that can route incoming telephone calls to intended call recipients, or agents. The ACD 16 will be recognized to be a sub-system that can provide call queuing and automatic wait handling of incoming telephone calls. The PBX/ACD 16 can be coupled to one or more interactive voice response systems 18 (IVR). The IVR 18 will be recognized to be a system that provides voice queries to a telephone caller. Voice queries typically direct the telephone caller through a series of selections that can be chosen by the telephone caller via button pushes on the telephone keypad.

Within the IVR queries, the telephone caller can be directed by the IVR 18 to select an option that connects the telephone caller, via the PBX/ACD 16, to one of a group of agents 20. The agents 20 can have access to agent telephones, of which agent telephone 22 is representative of all agent telephones. The agents 20 can also have access to agent computers, of which agent computer 24 is representative of all agent computers.

The PBX/ACD 16 is further coupled to a bus 26 that can be provided to couple together the PBX/ACD 16, the agent computers, for example agent computer 24, a computer telephony integration (CTI) server 28, an application server 30, a database server 32, a web server 34, and an email server 36. The bus 26 can correspond to an Ethernet local area network.

The IVR 18 can, among the IVR selections offered, request that the telephone caller enter "identifying information," for example an account number, by button pushes on the telephone keypad or by voice responses from the telephone caller. Identifying information can also be automatically provided by the PBX/ACD 16 without entry by the telephone caller with a variety of methods, including dialed number identification service (DNIS) and automatic number identification (ANI). The identifying information is passed through the PBX/ACD 16 to the bus 26. The CTI 28 receives the identifying information and coordinates the identifying information with "caller data," for example account history associated with the telephone caller, contained in the database server 32. An application program in the application server 30, can automatically provide a display of the caller data in a "screen pop" to the agent disposed upon the agent computer 24. Alternatively, the application program can reside within the agent computer 24.

When a contact center has no CTI 28, or if the screen pop is delayed by system data flow bottlenecks, the agent can manually identify the telephone caller using the agent computer 24 by manually entering the identifying information via the keyboard of the agent computer 24.

The contact center 14 can also be accessed via the internet 37, for example by a web user who accesses a web page associated with the contact center. The web user, via the internet 37, connects to the web server 34 for web page access. The web user can also be an email user, in which case the email user connects to the email server 36 via the internet 37. While web page access and email access have been described herein, the invention is not limited to only these specific internet applications. A variety of internet applications can access a variety of servers within the contact center 14.

The contact center 14 provides contact center functions, that can include, for example, data transfer functions within the contact center 14, any of which may not function with a desirable accuracy or speed. It is therefore desirable to test the contact center functions. Virtual test systems have been applied to contact centers. For example, virtual telephone caller systems 38 have been provided to simulate telephone callers within the PSTN 12. The virtual telephone caller system 38 can generate "virtual telephone caller actions," for example virtual telephone calls, to the contact center 14, thereby accessing the PBX/ACD 16, the IVR 18, and agent telephones, for example agent telephone 22. The virtual telephone caller system 38 can also receive contact center functions, for example an IVR response. With this particular arrangement, the IVR 18 can be tested for response accuracy and response time. The PBX/ACD 16 can be tested for agent telephone access integrity and response time.

Similarly, virtual agent telephone systems 40 have been provided that can generate "virtual agent telephone actions" to simulate agents 20 within the contact center 14 who answer telephone calls. The virtual agent telephone system 40 can also receive contact center functions, for example automatic voice data.

As mentioned above, the various elements of the contact center 14 can provide a screen pop upon the agent computers, for example agent computer 24. Virtual agent computer systems 42 have been provided that can generate "virtual agent computer actions" and receive contact center functions, for example screen pops and accesses to the data base server 32, to test the accuracy and the speed of such screen pops and the general speed and accuracy of accesses to the database server 32. The virtual agent computer system 42 can simulate multiple agent computers 24.

Virtual web user systems 44 have been provided that can generate "virtual web user actions" and receive contact center functions to test the internet functions of the contact center 14. For example, the virtual web user system 44 can simulate one or more web users who access the contact center web pages that reside upon the web server 34. The web connection and web server 34 can thus be tested for web page accuracy and speed. Similarly, the virtual web user system 44 can simulate multiple emails from multiple web users. The web connection and the email server 36 can be tested for accuracy and speed.

As described above, contact center actions include actions generated by agents 20 within the contact center 14 as well as actions by people outside of the contact center, for example telephone callers and web users. Simulated contact center actions can include virtual telephone caller actions, virtual web user actions, virtual agent telephone actions, and virtual agent computer actions.

Contact center functions include data transfers that occur within the contact center 14, and such data can be internal to the contact center or can be provided to agents 20, telephone callers and web users. Contact center functions include, but are not limited to, accesses to and responses from the IVR 18, CTI 28 transactions, the screen pops, accesses to the application server 30, the accesses to the database server 32, accesses to the web server 34, and accesses to the email server 36.

Various types of test data, not directly obtainable with the conventional virtual test systems 38, 40, 42, 44 are of interest to control center designers and managers. In particular, a variety of delay time periods or latencies are of interest. For example, contact center designers are interested in the time latency between a variety of the virtual telephone caller actions, the virtual agent telephone actions, the virtual agent computer actions, the virtual web user actions, and the contact center functions. The virtual telephone caller action can, for example, correspond to an IVR selection, using the telephone keypad, as a request for connection to an agent generated by the virtual telephone caller system 38. The contact center function can, for example, correspond to a screen pop upon the agent computer 24 associated with the virtual agent computer system 42. The time latency of interest can, for example, correspond to the time period between the request for connection to an agent and the screen pop.

It should be recognized that the screen pop is a complex operation coordinated by the PBX/ACD 16 that can receive the caller identifying information, the CTI 28 that can coordinate the identifying information with caller data, the application server 30 that accesses the caller data from the database server 32, and the agent computer 24 that displays the caller data. Thus, the screen pop on the agent computer 24 often occurs with a time latency compared to the time at which the telephone caller is connected to the agent telephone 22.

The above is but one example of a test of time latency that is of interest to a contact center designer. Other types of data that are of interest are described below.

Figure 2:
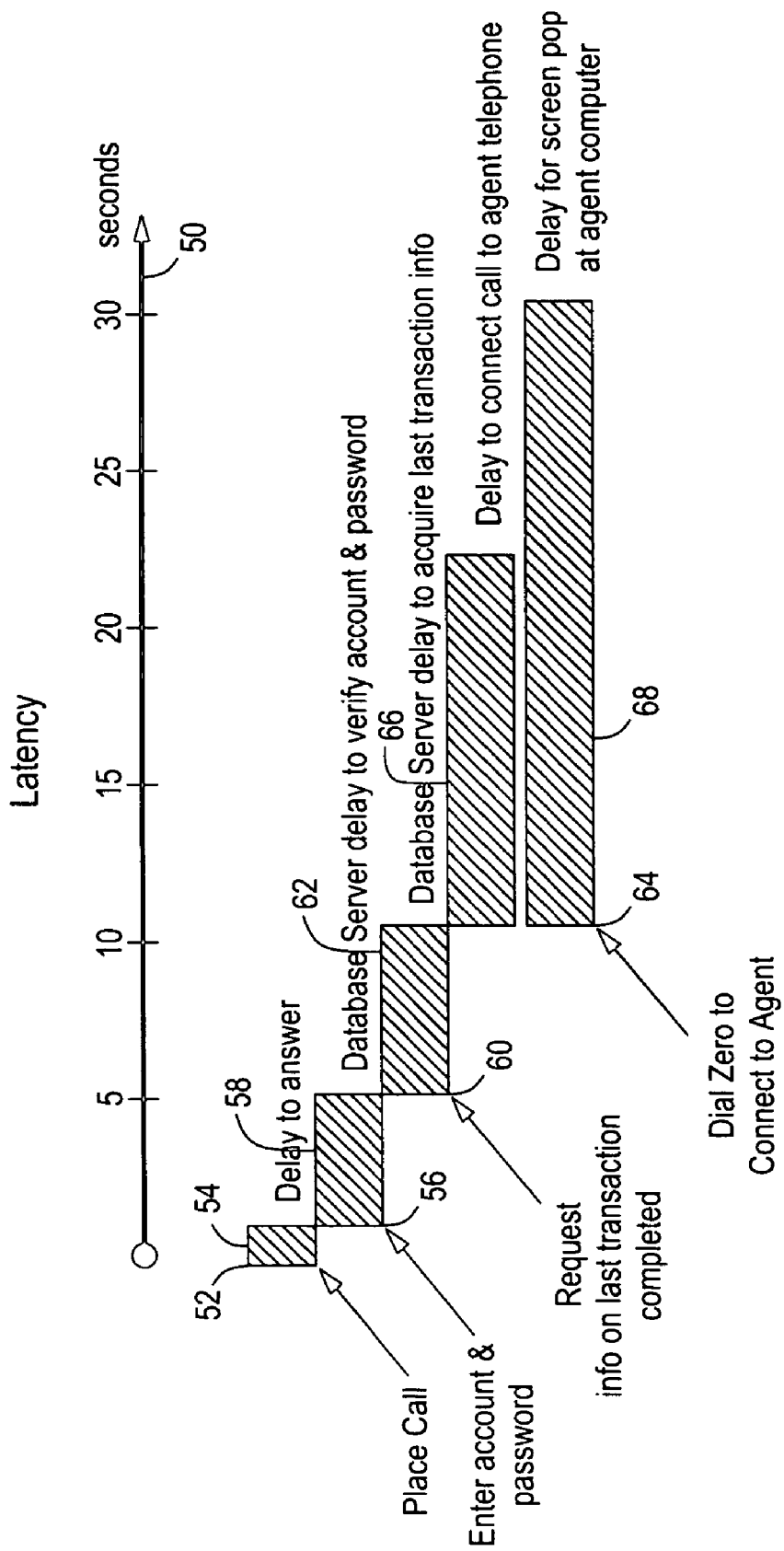
FIG. 2 is a chart showing illustrative time latencies between a variety of transactions of a contact center.

Referring now to FIG. 2 in combination with FIG. 1, a chart shows a variety of illustrative latency data that can be obtained in accordance with the present invention. A time scale 50, shown in units of seconds, indicates exemplary latencies associated with contact center functions. The transactions described below pertain either to a telephone caller or to a virtual telephone caller system 38, to either an agent telephone or to a virtual agent telephone system 40, and to either an agent computer or to a virtual agent computer system 42.

A telephone caller places a telephone call at time 52 to the contact center 14. The contact center 14 answers the call with an IVR system 18 and with a time latency represented by time bar 54. At time 56, the IVR system 18 requests that the telephone caller enter identifying information, for example account and password via the telephone keypad. Alternatively, as mentioned above, the contact center can automatically identify the telephone caller at time 56. The contact center verifies that the telephone caller identity is valid by accessing the database server 32 with a latency represented by time bar 58. At time 60, the contact center 14 uses the CTI 28 to coordinate the identifying information with caller data within the database server 32. For example, the caller data can correspond to the last transaction completed by the telephone caller. The latency of the coordination of the identifying information with caller data is represented by time bar 62. At time 64, the IVR system 18 suggests that the caller dial zero to connect to an agent 20, and the telephone caller presses zero. The telephone caller is connected to an agent telephone 22 with a latency represented by time bar 66. A screen pop including caller data appears at the agent computer 24 with a latency represented by time bar 68. As can be seen, in this illustrative example, the screen pop at the agent computer 24 occurs approximately seven seconds after the telephone caller is connected to an agent telephone 22.

It will be recognized that if any of the latencies 54, 58, 62, 66, 68 were to be excessive, the contact center would not provide optimal service to the telephone caller. Thus, it would be desirable for a contact center designer and a contact center manager to obtain latency time information associated with the various operations of the contact center.

The latency times of interest include, but are not limited to those indicated above. As indicated below, this invention can provide measurements of a variety of contact center latency times.

Figure 3:
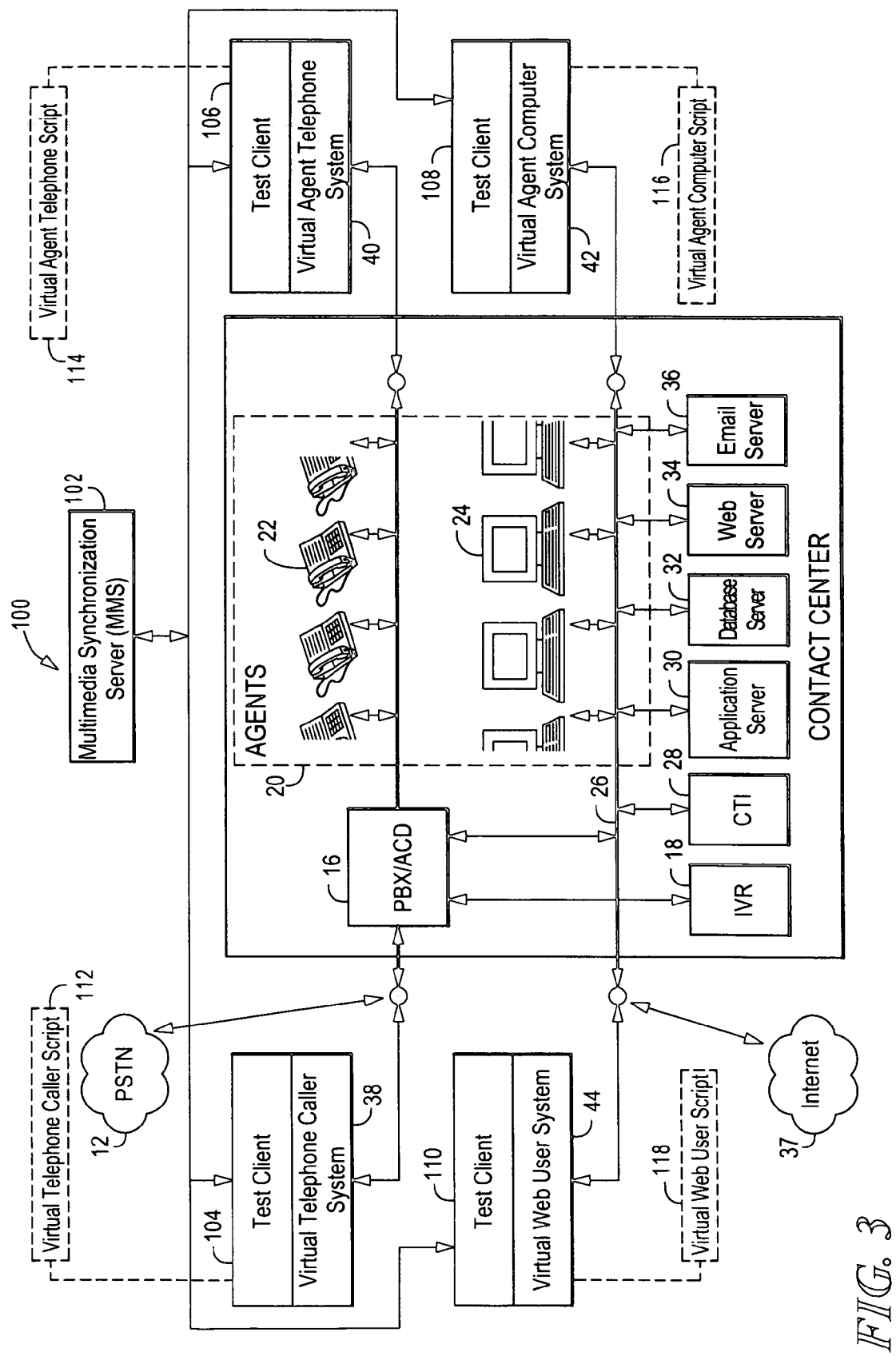
FIG. 3 is a block diagram of the contact center having both conventional virtual test systems and a multimedia synchronization system coupled thereto.

Referring now to FIG. 3, for which like elements of FIG. 1 are shown having like reference designations, a multimedia synchronization system 100 applied to a contact center 14 and virtual test systems 38, 40, 42, 44 includes a multimedia synchronization server (MSS) 102, also called a synchronization server herein. The MSS 102 is coupled, for example with a TCP/IP connection disposed on an Ethernet local area network 26, to a variety of test client computers 104, 106, 108, 110, or simply clients, herein. Each of the test clients 104, 106, 108, 110 is associated with a virtual test system 38, 40, 42, 44. Each test client 104, 106, 108, 110 can be a computer separate from the virtual test system 38, 40, 42, 44 to which it is associated. Alternatively, one or more of the test clients 104, 106, 108, 110 can be software that runs within the existing hardware of the virtual test systems 38, 40, 42, 44. Regardless of the configuration, test client 104 contains software having a virtual telephone caller script 112, test client 106 contains software having a virtual agent telephone script 114, test client 108 contains software having a virtual agent computer script 116, and test client 110 contains software having a virtual web user script 118. Herein, the term "script" will used synonymously with the term "program."

The MSS 102 is provided having a server program that functions to synchronize the operations of the various test clients 104, 106, 108, 110. Synchronization will be described in subsequent figures. Let it suffice here to say, that the MSS 102 can identify a particular action initiated by a particular virtual test system, for example the virtual telephone caller system 104, and identify a corresponding contact center action and/or contact center function generated by or received by another virtual test system. With this particular arrangement, the multimedia synchronization system can test and measure time latencies corresponding to the contact center actions and functions.

While four test client computers 104, 106, 108, 110 are shown in association with four virtual test system 38, 40, 42, 44 having four scripts 112, 114, 116, 118, it should be recognized that any number of test clients associated with respective virtual test systems and scripts, including one test client and one virtual test system having one script, can be provided by this invention. Also, while one MSS 102 is shown, it should be recognized that the test clients can be coupled to any number of MSS servers. Similarly, each test client can be coupled to any number of MSS servers.

A variety of test data can be provided by the multimedia synchronization system 100. Time latencies between a variety of actions generated by one or a variety of virtual test systems, including the virtual telephone caller system 38, the virtual web user system 44, the virtual agent telephone system 40, and the virtual agent computer system 42, can be provided. Time latencies between the variety of actions generated by one or the variety of virtual test systems and a variety of contact center functions can also be provided. Time latencies between the variety of contact center functions can also be provided.

Exemplary test data can include a time latency from an action requesting connection to an agent 20 to a screen pop upon an agent computer 24, a time latency for the IVR 18 to answer a telephone call generated by the virtual telephone caller system 38, an IVR 18 prompt response time, a time latency for CTI 28 data to arrive at the agent computer 24, a time latency for the agent computer 24 display screen to complete, a time latency for the agent computer 24 to receive events from the CTI, a time latency for the virtual telephone caller system 38 to connect to the agent telephone 22 once requested by the virtual telephone caller system 38, the database server 32 access time, a routing accuracy corresponding to a connection between the virtual telephone caller system 38 and the agent 20 upon a request from the virtual telephone caller system 38 for connection to the agent 20, and a display accuracy associated with the agent computer 24 screen pop data integrity.

Figure 4:
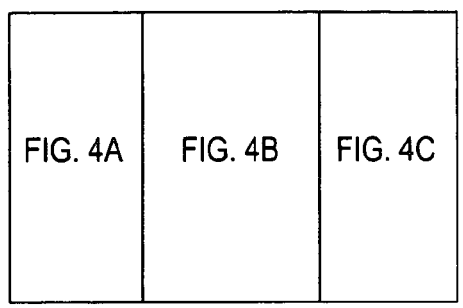
FIG. 4 is comprised of FIGS. 4A–4C, which taken together are a flow chart showing an illustrative example of a synchronous transaction between two test clients and a multimedia synchronization server (MSS)
Figure 4A:
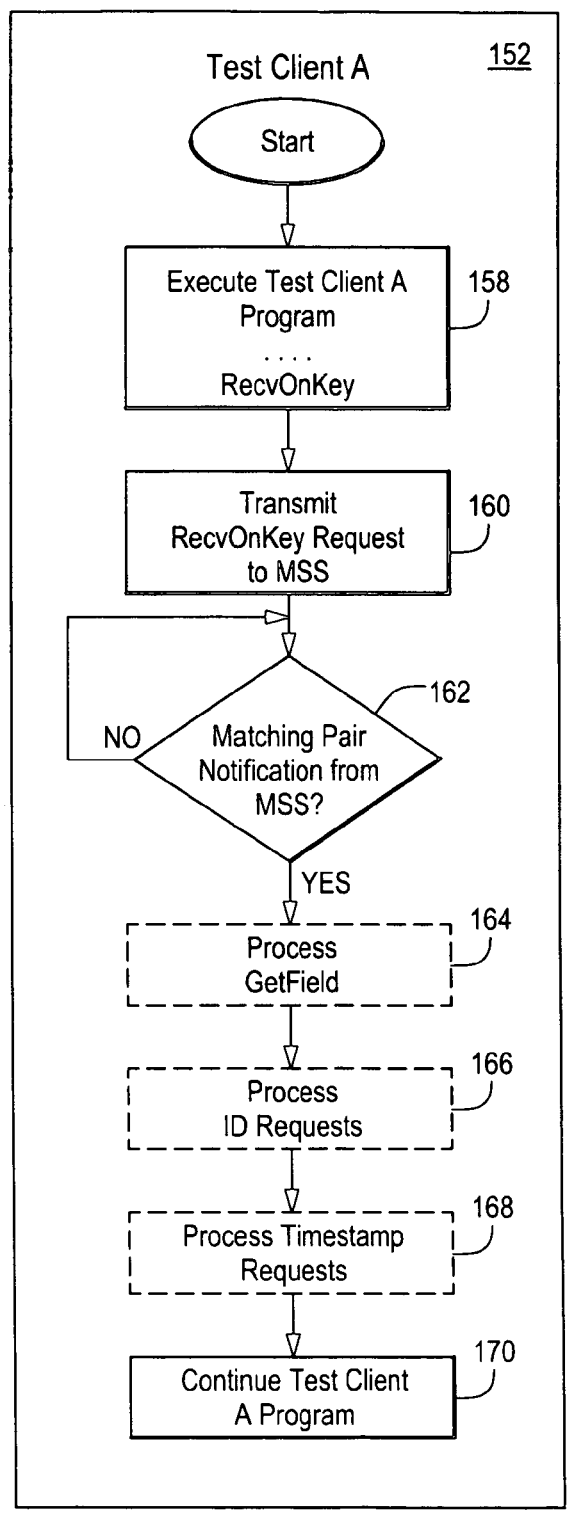
Figure 4B:
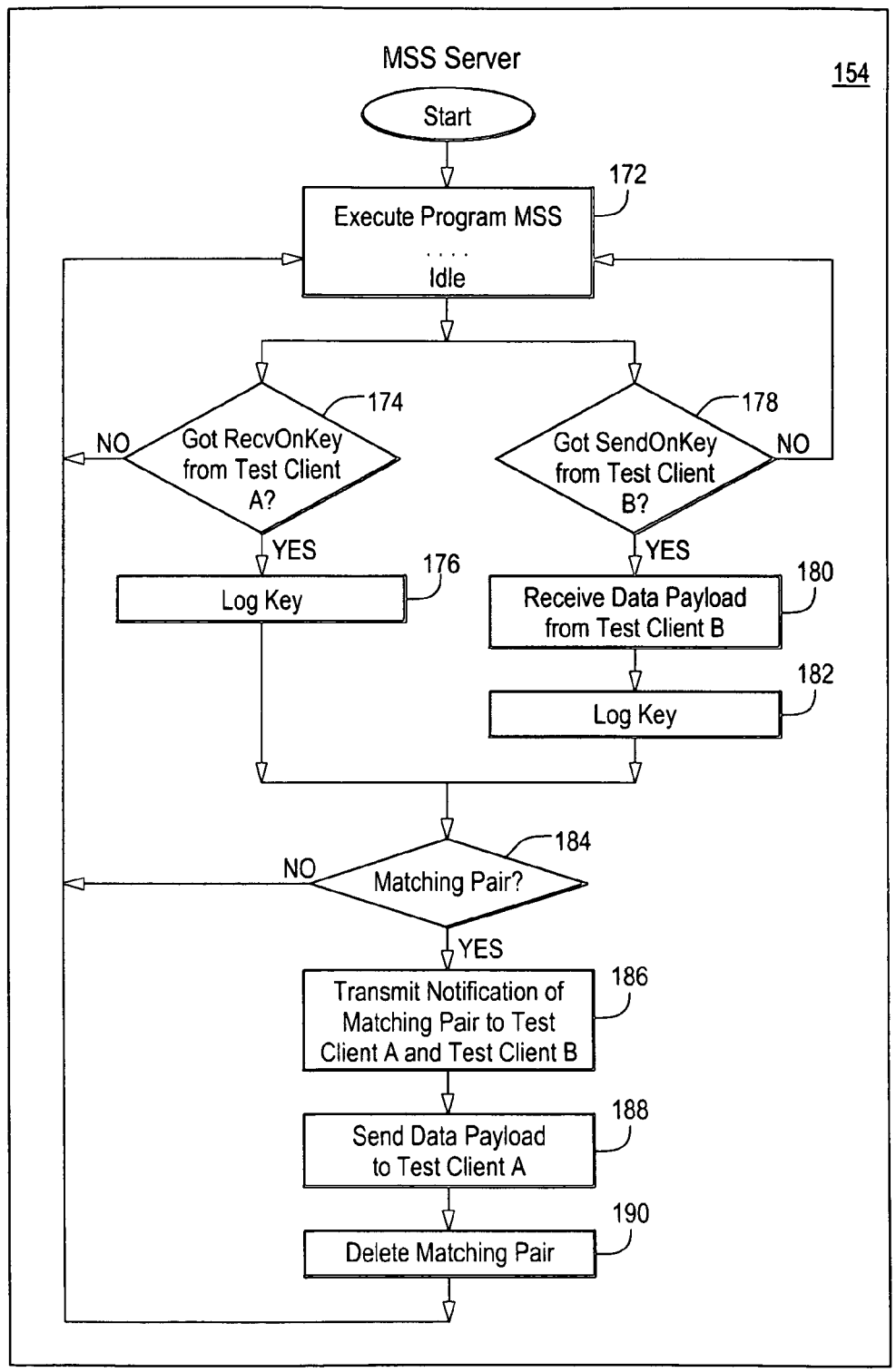
Figure 4C:
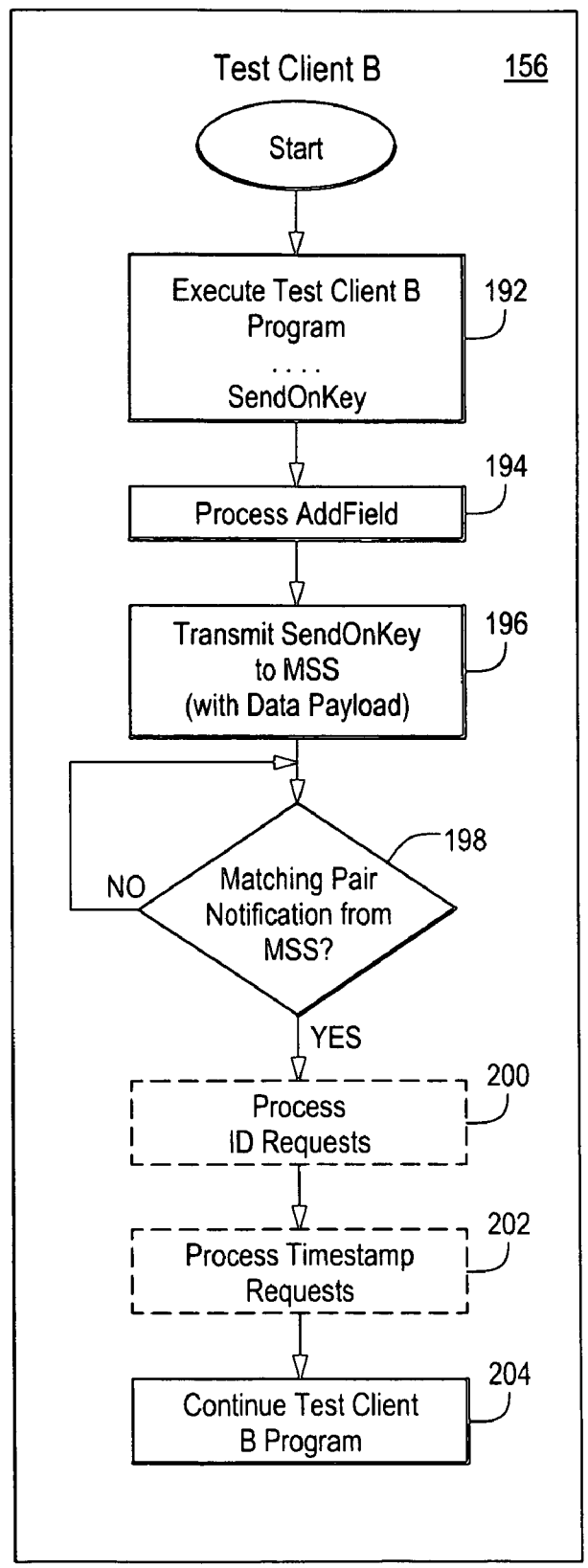

Referring now to FIG. 4, a flow chart 150 of an illustrative example of the synchronization services system includes test client A functions 152, MSS functions 154, and test client B functions 156. The test client A functions 152 begin with execution of a test client A computer program at step 158.

The test client A computer program proceeds until it encounters a RecvOnKey request, or instruction, within the test client A program. The RecvOnKey request is transmitted to the MSS at step 160. As mentioned above, the communication link between the various test clients and the MSS can be TCP/IP protocol upon an Ethernet physical layer. However, the communication link can be provided having a variety of protocols and a variety of physical layers. Though a RecvOnKey syntax is shown, any syntax can be provided corresponding to the described function. Though two test clients are shown, it will be understood that the synchronization services system can apply to any number of test clients.

The RecvOnKey request is provided having a "key" value corresponding to identification data that can identify the instruction uniquely from among other similar RecvOnKey instructions. test client A delays further software flow at step 162, where it waits pending a notification from the MSS that a request has been received that is identified by the MSS as part of a "matching pair" of requests, having both a "logical match" and having a matching key value. A request with a logical match and with a matching key value can be provided, for example, by the test client B functions 156.

As mentioned above, requests can be both logically related and key value related. Requests of various types can be pre-defined to be logically related. For example, the RecvOnKey request, here associated with test client A, is logically related to a SendOnKey Request from any other test client. The SendOnKey request will be shown below to be associated with test client B. These two requests provide a "logical match." When requests having a logical match also have a matching key value, the MSS identifies a "matching pair." When the MSS receives a new request from any test client, it compares the new request with those that it previously received to see if a matching pair can be identified.

The test client A program delays further progress at step 162 until a notification is received from the MSS that a matching pair has been identified by the MSS. In this illustrative example, a SendOnKey request, logically related to the RecvOnKey request from test client A, and with a matching key value has been received from test client B. The SendOnKey request from test client B is provided having client B test data included in a data payload that can be provided by the MSS to test client A. The SendOnKey request will be described below. Let it suffice here to say that test client A loops at step 162 until a logically related request with a matching key value is made by test client B.

It will become apparent from discussion below, that the RecvOnKey request by test client A can be associated with a particular action performed upon a virtual test system associated with test client A. For example, the RecvOnKey request can be associated with a dial zero virtual telephone caller action (to connect to an agent) performed by a virtual telephone caller system associated with test client A.

A variety of optional functions can be performed by test client A, for which function blocks are shown having phantom lines. Having received notification of a matching pair, and having received the associated data payload, including the client B test data, from the MSS, the test client A functions proceed to optional step 164 at which test data fields are selected from among the test data included in the data payload with a GetField function syntax, or any syntax the performs the equivalent function. The selected test data can be used by the test client A program.

At step 166, test client A can request a variety of identification (ID) information included in the data payload received by test client A. For example, test client A can request ID information corresponding to the server that transmitted the matching SendOnKey request, here test client B. For another example, test client A can request ID information that identifies test client A.

At step 168, test client A can request a variety of timestamps. Timestamp information is generally provided to time coordinate the various MSS test clients and the time measurements performed by the virtual test systems associated with the various test clients. For example, test client A can request the time at which the matching pair was generated. For another example, test client A can request the time at which any request was transmitted to the MSS by any other test client. For yet another example, test client A, or any test client, can request to the MSS an MSS timestamp corresponding to the real time clock within the MSS computer. It should be recognized that by requesting the timestamp associated with the MSS real time clock, an test client can coordinate its real time clock with that of the MSS.

At step 170, the test client A program continues, and proceeds to other functions and requests as pre-determined by the computer programmer.

Continuing at the test client B functions 156, at step 192 the test client B program is executed. It should be recognized that the test client B program can begin asynchronously from the start of the test client A program at step 158. Alternatively, one or more test client programs can be initiated synchronously by command from the MSS. The test client B computer program proceeds until it encounters a SendOnKey command within the test client B program. At step 194, an AddField command, associated with the SendOnKey command, is provided to specify data fields of the data payload that is associated with the SendOnKey request. The SendOnKey request along with the data payload is transmitted to the MSS at step 196. As mentioned above, the communication link can be provided having a variety of protocols and a variety of physical layers. Though an AddField and a SendOnKey syntax are shown, any syntax can be provided corresponding to the described functions.

The test client B program delays further progress at step 198, where, like test client A at step 162, it waits pending a notification from the MSS that a matching pair has been identified by the MSS. test client B loops at step 198 until a logically related request with a matching key value is made by another test client, here test client A. Upon receipt of the notification from the MSS of a matching pair, test client B can request ID requests at step 200, and request timestamps at step 202 as described above for test client A at steps 166 and 168 respectively.

It should be understood that the sequence of the RecvOnKey and SendOnKey requests is of no importance. Only when the MSS identifies a matching pair can the programs of test clients A and B continue, regardless of which request is made first. In this illustrative example, the RecvOnKey request from test client A has already been received by the MSS and a matching pair is identified by the MSS upon transmission of the SendOnKey by test client B at step 196, if the associated key value matches that of the RecvOnKey request from test client A.

It should be understood that the data payload from test client B can be associated with a particular function of the contact center and measurement thereof performed by a virtual test system associated with test client B. For example, where test client B is associated with a virtual agent computer system, the SendOnKey request, with data payload, can include a time measurement of a contact center function corresponding to a screen pop. Thus, in this illustrative example, it can be seen that the test client A RecvOnKey request corresponding to a dial zero virtual telephone caller action can be matched with a test client B SendOnKey request corresponding to a contact center function and measurement thereof, for example the real time of a screen pop. Thus, a latency time from action to contact center function can be provided.

In general, latency measurement from action to contact center function are of great interest to the contact center designer and manager. Though one particular latency measurement, from a dial zero virtual telephone caller action provided by a virtual telephone caller system, to a screen pop contact center function measured by a virtual agent computer system has been described above, a variety of latency measurements can be provided in accordance with this invention. Other illustrative latency measurement will be described in association with FIG. 8. Still other illustrative measurements provided by the multimedia synchronization system are described above in association with FIG. 3.

It should be recognized that the test client A program functions 152 and the test client B program functions 156 can be associated with a variety of time latency measurements. Though the figure shows that test client A requests one action and test client B performs one measurement of a contact center function, any test client can request multiple actions or perform multiple measurements or both. The MSS provides functionality by which actions and measurements can be matched.

The MSS functions 154 begin at step 172, at which the MSS program begins. The MSS program can initialize the test client A functions 152 and the test client B functions 156. For example, the initialization can include an MSS timestamp request to/from each test client, so that their respective real time clocks can be coordinated.

At step 172, the MSS sits idle until a request is generated by a test client, here test client A or test client B. Upon receiving a request from a test client, the request is analyzed at steps 174 and 178. A variety of requests can be received by the MSS. For clarity here, only two such requests are shown. Here, the received request, among a variety of requests that can be received by the MSS, is analyzed at steps 174 and 178 to determine if it is a RecvOnKey request at step 174 or a SendOnKey request at step 178. Other request types are similarly shown in association with FIGS. 5–7. If a RecvOnKey request is received by the MSS, the request is logged at step 176. At step 176, the MSS stores the request, the key value that uniquely identifies the request, and a first request timestamp corresponding to the time at which the request was received by the MSS. Conversely, if a SendOnKey request is received by the MSS, the data payload associated with the request is received at step 180, and logged at step 182. At step 182, the MSS stores the request, the key value that uniquely identifies the request, and a second request timestamp corresponding to the time at which the request was received by the MSS. If the request was neither SendOnKey nor RecvOnKey, then the MSS goes back to the idle condition at step 172. As mentioned above, since any number of request types can be received by the MSS in accordance with this invention, for clarity only the two that can form a matching pair are shown here. Further examples of other requests can be similarly analyzed by the MSS as will be further described in FIGS. 5–7.

If either a SendOnKey request or a RecvOnKey request is received and logged at steps 176 or 182, the process continues at step 184. At step 184, the MSS determines whether a request has been previously received that matches the request most recently analyzed at step 174 or step 178 so as to create a matching pair. There are a variety of pairs of requests that can be provided in accordance with this invention that can generate a matching pair. Here, the RecvOnKey and SendOnKey matching pair is but one example. Requests that have a logical match with the RecvOnKey request include, but are not limited to a SendOnKey request of this particular illustrative example, and a SendOnKeyAsync request. The SendOnKeyAsync request will be further defined in association with FIG. 5.

If no matching pair is identified at step 184, the MSS returns to idle at step 172 awaiting the next test client request. At step 186, when a matching pair is detected, the MSS sends a notification of a matching pair to each of the test clients, here test client A and test client B. At step 188, the data payload associated with the SendOnKey request from test client B, and delivered to the MSS along with request, is sent to test client A. At step 190, the matching pair of requests is deleted from the MSS memory.

When, at steps 186 and 188, the notification of a matching pair is sent to the test clients, each test client, here test client A and test client B, previously in a suspended state of operation at steps 162 and 198 respectively, resume their operation as previously described.

With this particular arrangement, an action associated with a RecvOnKey request can be matched with a contact center function and time measurement thereof associated with a SendOnKey request. It should be appreciated that a variety of actions and measurements of corresponding contact center functions can be matched in this way.

While two test client programs 152, 156 are shown, it should be recognized that the instructions described above apply equally well to any number of test clients having associated computer programs, including one test client having one computer program.

Figure 5:
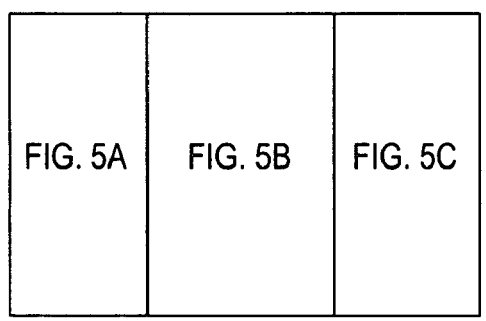
FIG. 5 is comprised of FIGS. 5A–5C, which taken together are a flow chart showing an illustrative example of an asynchronous transaction between the two test clients and the MSS.
Figure 5A:
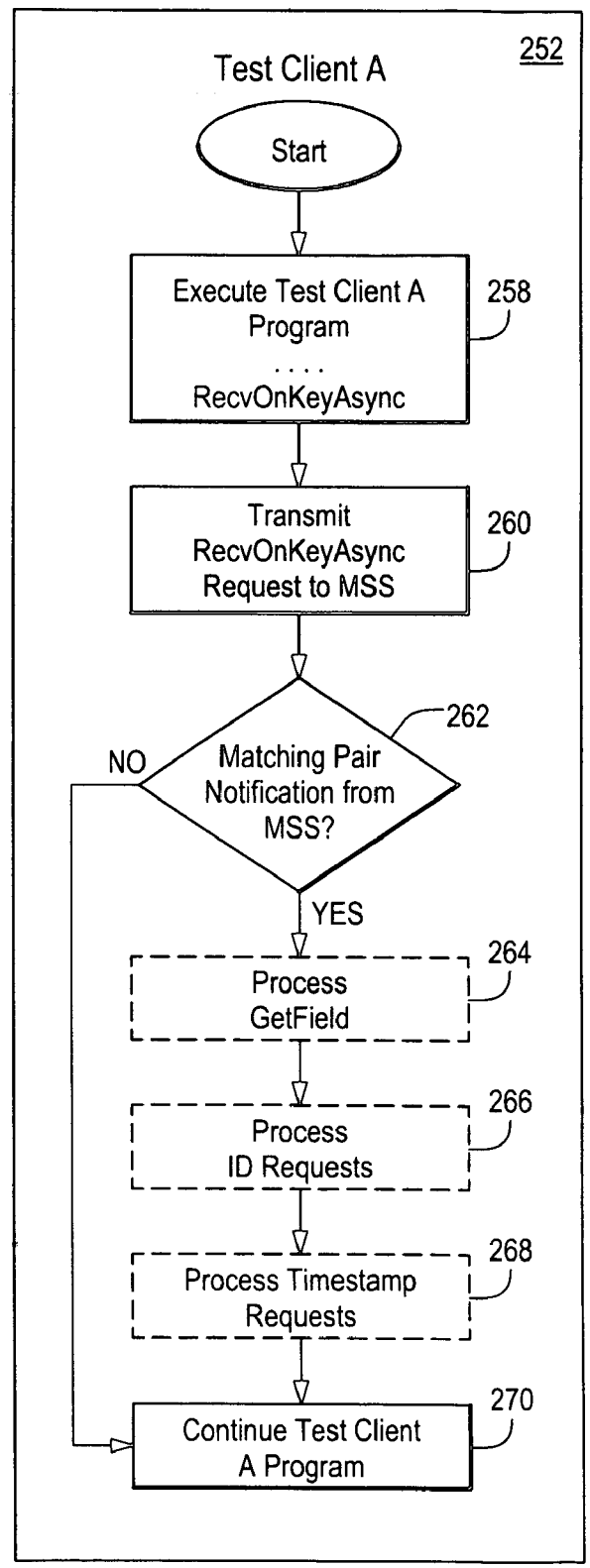
Figure 5B:
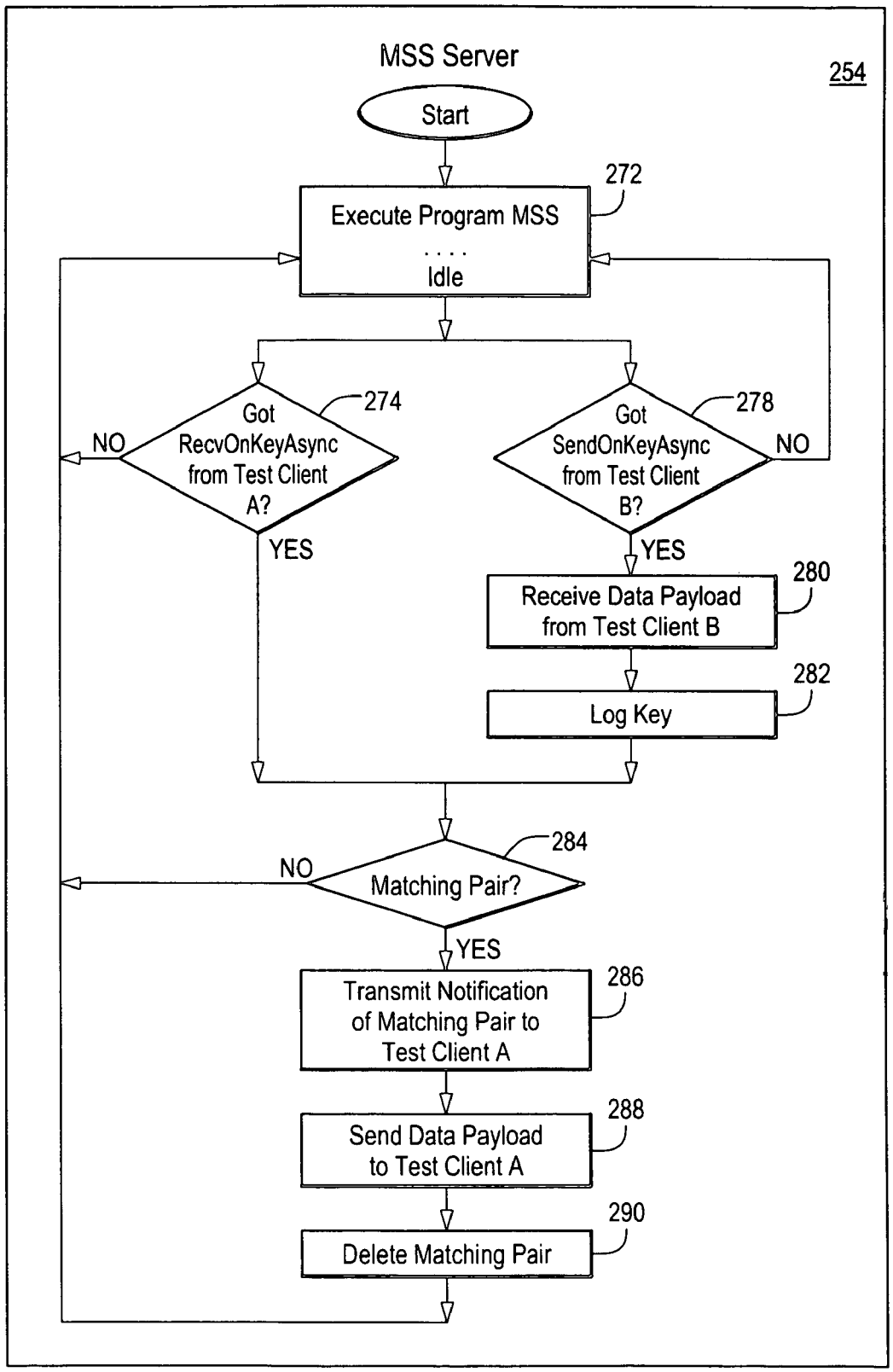
Figure 5C:
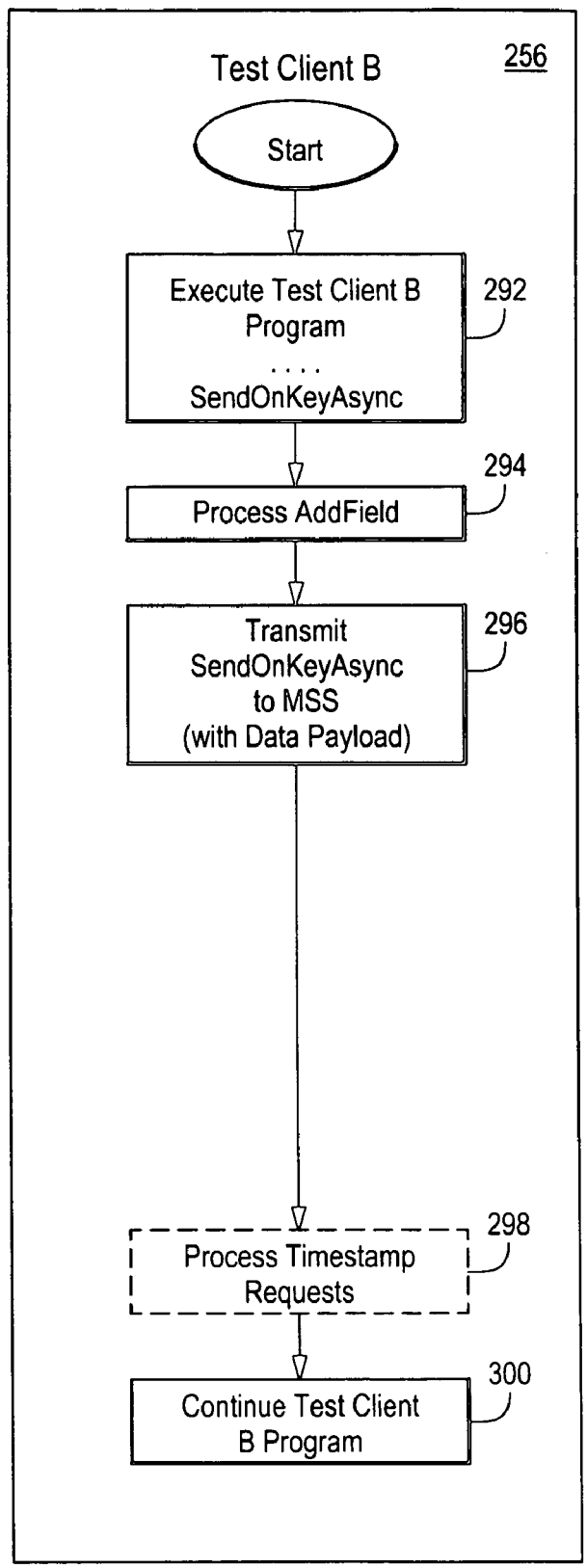

Referring now to FIG. 5, a flow chart 250 of another illustrative example of the multimedia synchronization system includes test client A functions 252, MSS functions 254, and test client B functions 256. The test client A functions 252 begin with execution of a test client A computer program at step 258.

The test client A computer program proceeds until it encounters a RecvOnKeyAsync request within the test client A program. The RecvOnKeyAsync request is transmitted to the MSS at step 260. Though a RecvOnKeyAsync syntax is shown, any syntax can be provided corresponding to the described function.

Like the RecvOnKey request described above, the RecvOnKeyAsync request is provided having a "key" value that can identify the instruction uniquely from other similar RecvOnKey instructions. Unlike the RecvOnKey request, the RecvOnKeyAsync request does not suspend the software flow of test client A at step 262. The progression through optional functions 264–268, shown as boxes with phantom lines, proceeds in a path depending upon whether a notification of a matching pair is received from the MSS.

A matching pair is identified by the MSS if a request, for example a SendOnKeyAsync, having a logical match with the RecvOnKeyAsync request and with the matching key value is received by the MSS from another test client. A request with a logical match and with a matching key value can be provided, for example, by the test client B functions 256.

Similar to the RecvOnKey request described above, the RecvOnKeyAsync request by test client A can be associated with a particular action performed upon a virtual test system associated with test client A. For example, the RecvOnKeyAsync request can be associated with a dial zero virtual telephone caller action (to connect to an agent) performed by a virtual telephone caller system associated with test client A.

At step 262, the test client A program can receive a notification from the MSS that a matching pair has been identified by the MSS. In this illustrative example, a SendOnKeyAsync request with a matching key value has been received from test client B. The SendOnKeyAsync request will be described below. Let it suffice here to say that test client A proceeds to optional step 264 when notification of a matching pair is received from the MSS at step 262. The SendOnKeyAsync request from test client B is provided having a data payload, including the test data, that can be received by test client A. If no such notification is received at step 262, the test client A program does not delay further progress, but instead proceeds to step 270.

As described above in association with FIG. 4, a variety of optional functions can be performed by test client A, for which function blocks are shown having phantom lines. Having received notification of a matching pair, and having received the associated data payload from the MSS, the test client A functions proceed to optional step 264 at which test data fields are selected from among the test data included in the data payload with a GetField function syntax, or any syntax the performs the equivalent function. The selected test data can be used by the test client A program.

At step 266, test client A can request a variety of identification (ID) information such as that described above. At step 268, test client A can request a variety of timestamps, also as described above.

At step 270, the test client A program continues, and proceeds to other functions and requests as pre-determined by the computer programmer.

The test client B functions begin at step 292, where the test client B program execution begins. The test client B computer program proceeds until it encounters a SendOnKeyAsync command within the test client B program. At step 294, an AddField command, associated with the SendOnKeyAsync request is provided to specify specific data fields of the data payload that is associated with the SendOnKeyAsync command. The SendOnKeyAsync request along with the data payload is transmitted to the MSS at step 296. As mentioned above, the communication link can be provided having a variety of protocols and a variety of physical layers. Though an AddField and a SendOnKey syntax are shown, any syntax can be provided corresponding to the described functions.

Unlike the SendOnKey request of FIG. 4, the test client B program does not delay further progress. Instead, the test client B proceeds to step 298 at which a variety of timestamps can be requested, and to step 300 at which the test client B program continues. Again, as with the SendOnKey and RecvOnKey requests, it should be noted that the sequence of the RecvOnKeyAsync and SendOnKeyAsync requests is of no importance.

As with the SendOnKey request and the RecvOnKey request described above, it should be understood that the data payload from test client B corresponding to the SendOnKeyAsync request can be associated with a particular function of the contact center and measurement thereof performed by a virtual test system associated with test client B. For example, where test client B is associated with a virtual agent computer system, the SendOnKeyAsync request, with data payload, can correspond to a time measurement of a contact center function corresponding to a screen pop. Thus, in this illustrative example, the test client A RecvOnKeyAsync request corresponding to a dial zero virtual telephone caller action is matched with a test client B SendOnKeyAsync request corresponding to the real time of a screen pop. Again, a latency measurement is generated.

As mentioned with respect to FIG. 4, it should be recognized that the test client A program functions 252 and the test client B program functions 256 can include multiple actions and measurements. Though test client A requests one action and test client B is performs one measurement of a contact center function, any test client can request multiple actions or perform multiple measurements or both. The MSS provides means by which actions and measurements can be matched.

The MSS functions 254 begin at step 272, at which the MSS program begins. As described above, the MSS program can initialize the test client A functions 252 and the test client B functions 256. For example, the initialization can include an MSS timestamp request to/from each test client, so that their respective real time clocks can be coordinated.

At step 272, the MSS sits idle until a request is generated by a test client, here test client A or test client B. Upon receiving a request from a test client, the request is analyzed at steps 274 and 278. A variety of requests can be received by the MSS. As with FIG. 4, here, for clarity, only two requests are shown. Here, the request, among a variety of requests that can be received by the MSS, is analyzed at steps 274 and 278 to determine if it is a RecvOnKeyAsync request at step 274 or a SendOnKeyAsync request at step 278. Other request types are similarly shown in association with FIGS. 4 and 6–7. The MSS can identify a request as either a RecvOnKeyAsync request at step 274, or a SendOnKeyAsync request at step 278. If a SendOnKeyAsync request is received by the MSS, the data payload associated with the request is received at step 280, and the request is logged at step 282. At step 282, the MSS stores the request, the key value that uniquely identifies the request, and a second request timestamp corresponding to the time at which the request was received by the MSS. If the request was neither SendOnKeyAsync nor RecvOnKeyAsync, then the MSS goes back to the idle condition at step 272. Other requests can be similarly analyzed by the MSS as will be further described in FIGS. 6–7.

If either a SendOnKeyAsync request or a RecvOnKeyAsync request was received at step 274 or step 278, the process continues at step 284 (after logging the SendOnKeyAsync request at step 282). At step 284, the MSS determines whether a request has been previously received that matches the request most recently analyzed at step 274 or step 278 so as to form a matching pair. As mentioned above, there are a variety of pairs of requests that can be provided in accordance with this invention that can generate a matching pair. Requests that have a logical match with the RecvOnKeyAsync request include, but are not limited to, a SendOnKeyAsync request of this particular illustrative example, and a SendOnKey request described above. Similarly, requests that have a logical match with the SendOnKeyAsync request include, but are not limited to, a RecOnKeyAsync request of this particular illustrative example, and a RecOnKey request described above.

If no matching pair is identified at step 284, the MSS returns to idle at step 272 awaiting the next test client request. At step 286, when a matching pair is detected, the MSS sends a notification of a matching pair to only test client A. At step 288, the data payload associated with the SendOnKeyAsync request from test client B, and delivered to the MSS along with request, is sent to test client A. At step 290, the matching pair of requests is deleted from the MSS.

Unlike the illustrative example of FIG. 4, here test clients A and B do not suspend operation at steps 262 and 298 respectively (see FIG. 4 steps 162 and 198), but continue operation regardless of notification of a matching pair.

With this particular arrangement, functions within test client A and test client B that do not require particular sequence synchronization can still be matched, e.g., an action can still be matched with a particular contact center function though neither the test client A program nor the test client B program are suspended while waiting for a matching pair.

Again, while two test client programs 252, 256 are shown, it should be recognized that the instructions described above apply equally well to any number of test clients having associated computer programs, including one test client having one computer program.

Figures 6, 6A:
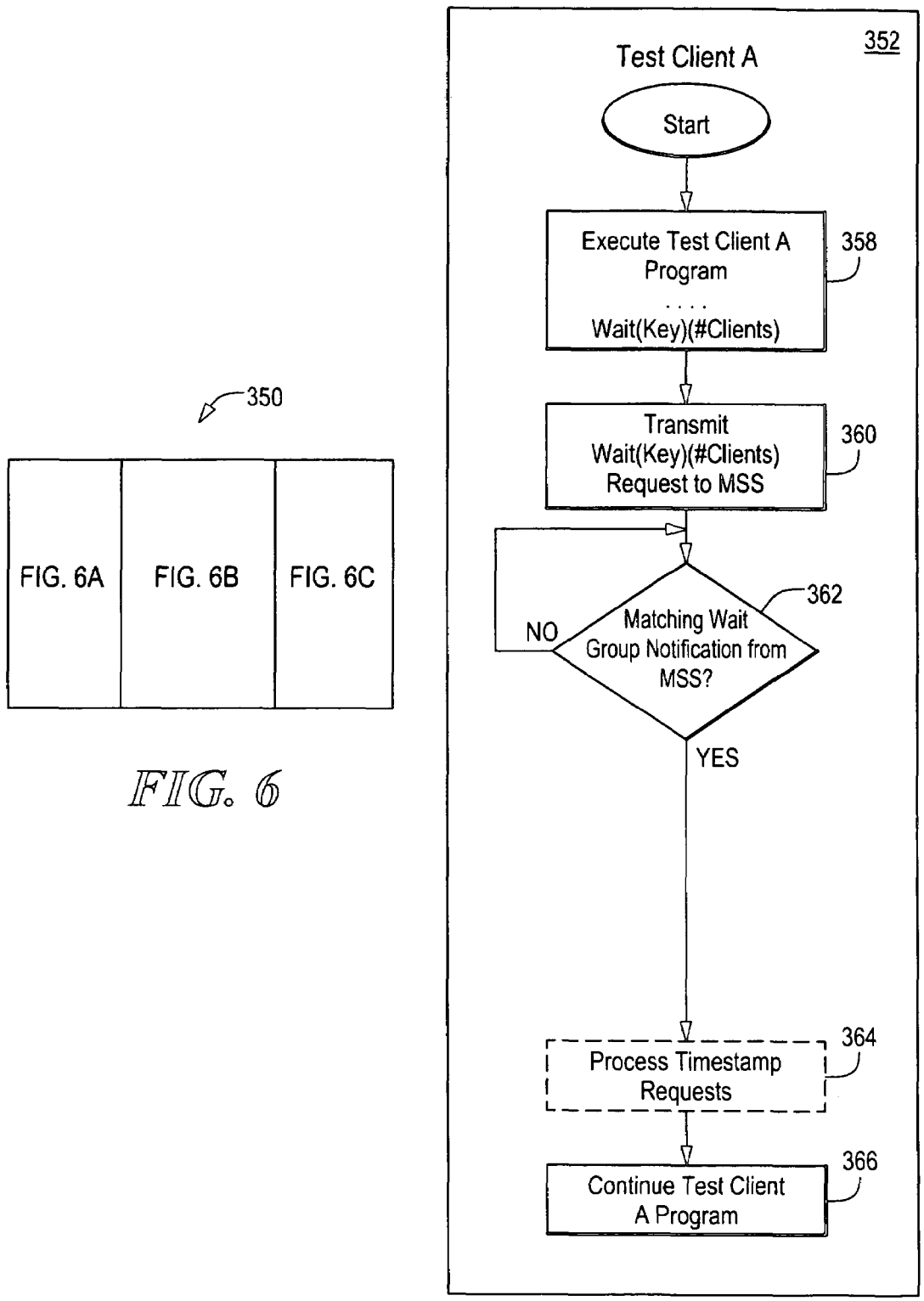
FIG. 6 is comprised of FIGS. 6A–6C, which taken together are a flow chart showing an illustrative example of another synchronous transaction between the two test clients and the MSS.
Figure 6B:
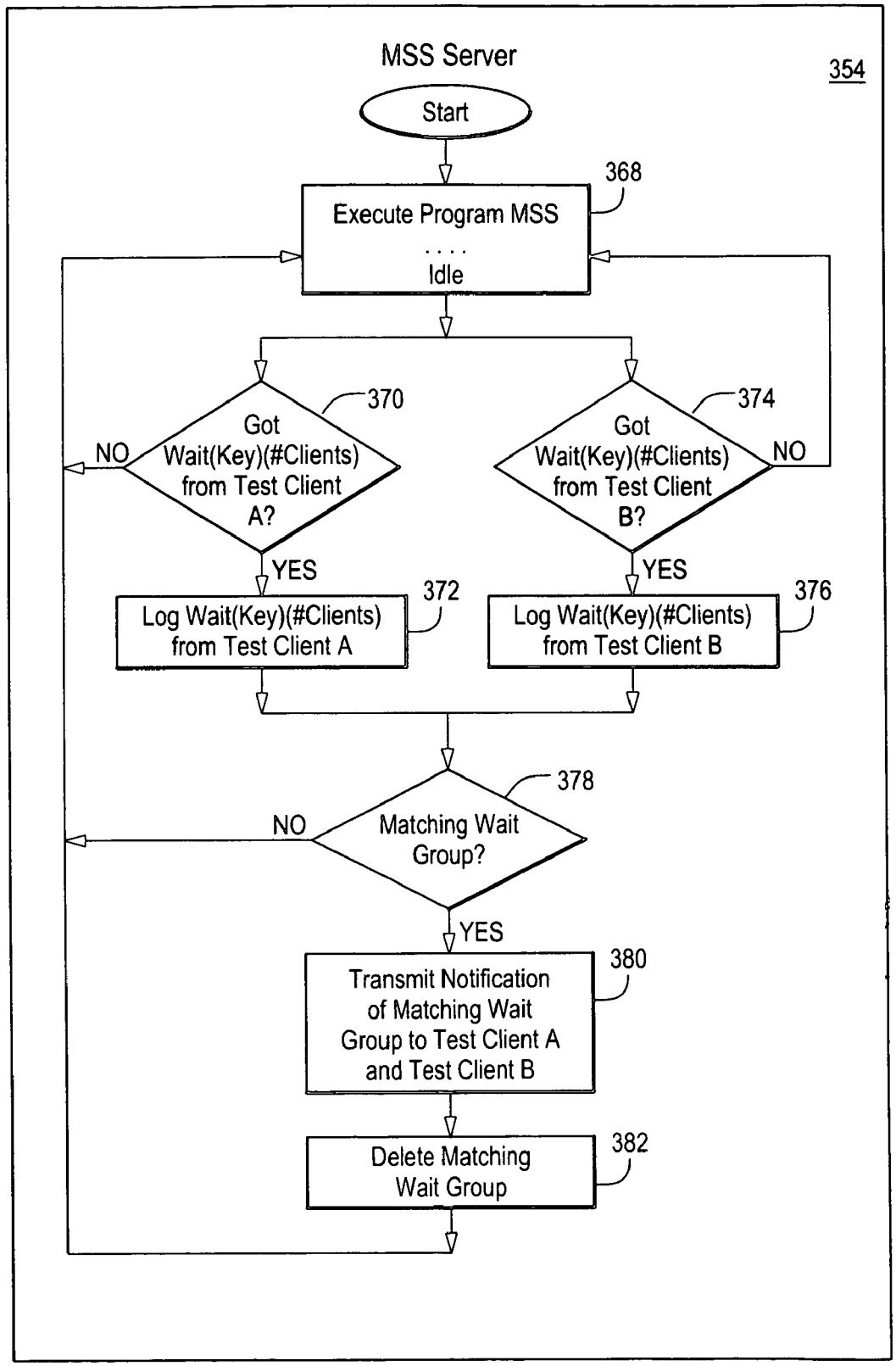
Figure 6C:
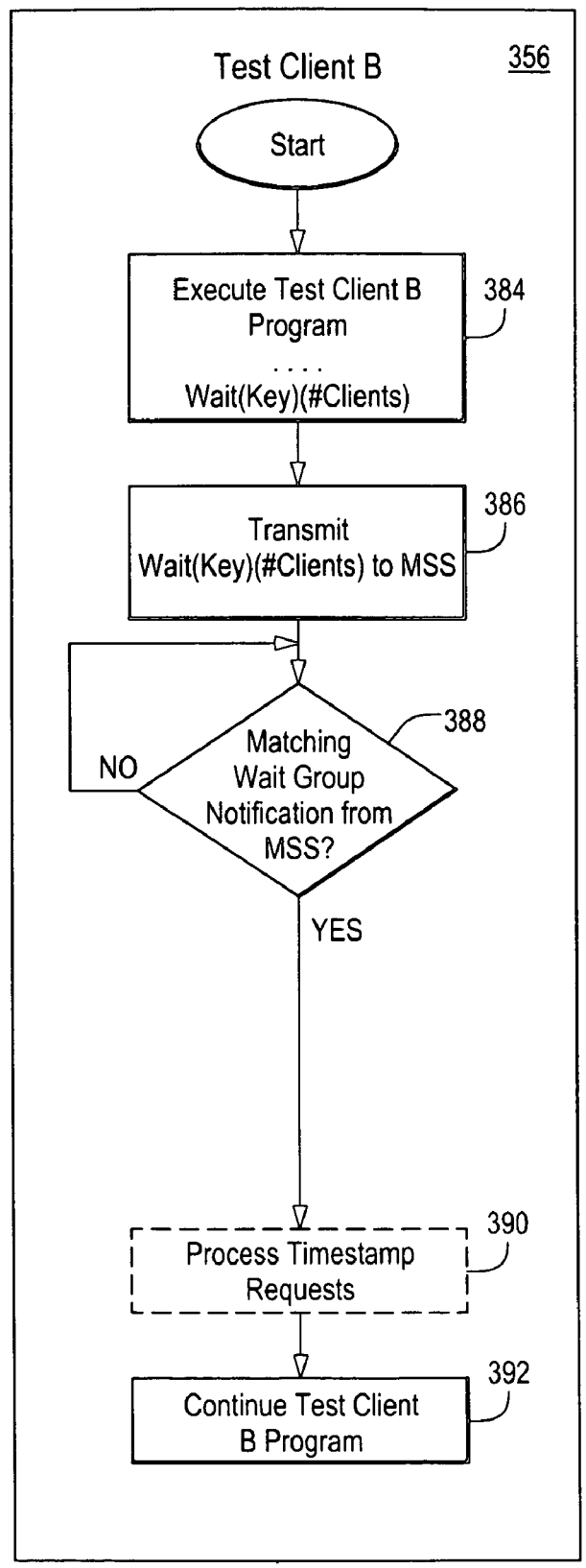

Referring now to FIG. 6, a flow chart 350 of an illustrative example of the multimedia synchronization system includes test client A functions 352, MSS functions 354, and test client B functions 356. The test client A functions 352 begin with execution of a test client A computer program at step 358.

The test client A computer program proceeds until it encounters a Wait(Key)(#Clients) request, or instruction, within the test client A program. The Wait(Key)(#Clients) request is transmitted to the MSS at step 360. Though a Wait(Key)(#Clients) syntax is shown, any syntax can be provided corresponding to the described function.

Like the SendOnKey, SendOnKeyAsync, RecvOnKey, and RecvOnKeyAsync requests mentioned above, the Wait(Key)(#Clients) request is provided having a "key" value that can identify the instruction uniquely from other similar Wait(Key)(#Clients) instructions. Unlike the requests mentioned above, the Wait(Key)(#Clients) request includes a "#Clients value" associated with the request. The MSS sends notification to the test clients of a "matching wait group" only when the required "number of clients" have made the Wait(Key)(#Clients) request to the MSS server. The #Clients value will be discussed more fully below.

The test client A delays further software flow at step 362, where it waits pending a notification from the MSS that a matching wait group has been identified by the MSS. If the #Clients value is equal to two, a request that fulfills the #Clients value equal to two and having a matching key value can be provided, for example, by the test client B functions 356.

Requests, including SendOnKey, SendOnKeyAsync, RecvOnKey, and RecvOnKeyAsync, can be both logically related and key value related. To form a matching wait group, wait requests must not only be logically related and key value related, but must also be #Clients value related. As described in association with FIGS. 4 and 5, some requests are pre-defined to be logically related. For example, the Wait(Key)(#Clients) request, here by test client A, is logically related to the Wait(Key)(#Clients) request from any other test client, here by test client B. These two requests provide a logical match. When requests having a logical match also have matching key values, the MSS can identify a "matching pair" as mentioned above. However, unlike requests mentioned in association with FIGS. 4 and 5, the MSS must identify a number of matching Wait(Key)(#Clients) requests as specified by the #Clients value.

When all three conditions are met, a matching wait group is identified by the MSS. The MSS notifies the test clients of a matching wait group only when the proper number of Wait(Key)(# Clients) requests are received by the MSS. It should be recognized that the #Clients value can be fulfilled either by Wait(Key)(#Clients) requests from any test client, or alternatively only from specific test clients. When the MSS receives a new request from any test client, it compares the new request with those that it previously received to see if a matching wait group exists. The MSS functions will be described more fully below.

It will become apparent from discussion below, that the Wait(Key)(#Clients) request by test client A can be associated with a particular action performed upon a virtual test system associated with test client A. For example, the Wait(Key)(#Clients) request can be associated with a dial zero virtual telephone caller action (to connect to an agent) performed by a virtual telephone caller system associated with test client A. Alternatively, the Wait(Key)(#Clients) request can be unrelated to a particular action, but rather provide a means by which a group of test clients can be forced to wait, suspending subsequent program execution, until all member of the group reach a certain point in their respective programs.

The test client A program delays further progress at step 362 until a notification is received from the MSS that a matching wait group is identified by the MSS. In this illustrative example, a Wait(Key)(#Clients) request with a matching key value has been received from test client B. Assuming that the #Clients value is two, a matching wait group is identified by the MSS and the test client A program functions 352 proceed. It should be noted that, unlike the SendOnKey and SendOnKeyAsync requests of illustrative examples above, the Wait(Key)(#Clients) request from test client B does not provide a data payload.

An optional function can be performed by test client A, for which the function block is shown having phantom lines. At step 364, test client A can request a variety of timestamps as described above. At step 366, the test client A program continues, and proceeds to other functions and requests as predetermined by the computer programmer.

At step 384 the test client B program is executed. It should be recognized that the test client B program can begin asynchronously from the start of the test client A program at step 158. Alternatively, one or more test client programs can be initiated synchronously by command from the MSS.

The test client B computer program proceeds until it encounters a Wait(Key)(#Clients) command within the test client B program. The Wait(Key)(#Clients) request is transmitted to the MSS at step 386. Note that no data payload is associated with the Wait(Key)(#Clients) request. As mentioned above, the communication link can be provided having a variety of protocols and a variety of physical layers. Though a Wait(Key)(#Clients) syntax is shown, any syntax can be provided corresponding to the described functions.

The test client B program delays further progress, at step 388, where, like test client A at step 362, it waits pending a notification from the MSS that a matching wait group has been identified by the MSS. test client B loops at step 388 until a Wait(Key)(#Clients) is made by another test client, here test client A. It should be noted that the sequence of the Wait(Key)(#Clients) request from test client A and Wait (Key)(#Clients) request from test client B is of no importance. Only when the MSS identifies a matching wait group can the programs of test clients A and B continue, regardless of which request is made first.

It should be understood that the Wait(Key)(#Clients) request 386 from test client B can be associated with a particular measurement of a function of the contact center performed by a virtual test system associated with test client B. For example, where test client B is associated with a virtual agent computer system, the Wait(Key)(#Clients) request can correspond to a contact center function and measurement thereof. Alternatively, the Wait(Key)(#Clients) request from test client B can be associated with no contact center function.

Upon notification from the MSS that a matching wait group has been identified, the test client B program functions proceeds at optional step 390. As mentioned above, various timestamp information can be requested to the MSS. The test client B program then continues at step 392.

It should be recognized that the test client A program functions 352 and the test client B program functions 356 can include any number of Wait(Key)(#Clients) requests. Though here it is shown that test client A requests one Wait(Key)(#Clients) and test client B requests one Wait (Key)(#Clients), any test client can request any number of Wait(Key)(#Clients) including any #Clients value.

The MSS functions 354 begin at step 368, at which the MSS program begins. As described above, the MSS program can initialize the test client A functions 352 and the test client B functions 356. For example, the initialization can include an MSS timestamp request to/from each test client, so that their respective real time clocks can be coordinated.

At step 368, the MSS sits idle until a request is generated by a test client, here test client A or test client B. Upon receiving a request from a test client, the request is analyzed at steps 370 and 374. A variety of requests can be received by the MSS. For clarity only two requests are shown as being analyzed by the MSS. Here, the Wait(Key)(#Clients) request, among a variety of requests that can be received by the MSS, is analyzed at steps 374 and 378 to determine if it is a Wait(Key)(#Clients) from test client A request at step 370 or a Wait(Key)(#Clients) request from test client B at step 374. Other request types are similarly shown in association with FIGS. 4–5 and 7. If a Wait(Key)(#Clients) from test client A request is received by the MSS, the request is logged at step 372. At step 372, the MSS stores the request, the key value and the #Clients value that uniquely identify the request, and a first request timestamp corresponding to the time at which the request was received by the MSS.

Conversely, if a Wait(Key)(#Clients) from test client B request is received by the MSS, the request is logged at step 374. At step 374, the MSS stores the request, the key value and the #Clients value that uniquely identify the request, and a second request timestamp corresponding to the time at which the request was received by the MSS. If the request was neither a Wait(Key)(#Clients) from test client A nor Wait(Key)(#Clients) from test client B, the MSS returns to step 368 where it remains idle awaiting the next request. Other requests can be similarly analyzed by the MSS as are further described in FIGS. 4–5 and 7.

If either a Wait(Key)(#Clients) from test client A request or Wait(Key)(#Clients) from test client B request was received and logged at steps 372 or 376, the process continues at step 378. At step 378, the MSS determines whether a request has been previously received that, in combination with the new request, generates a matching wait group. The matching wait group was described above. It should be remembered that a matching wait group can be fulfilled by requests that have a logical match, with matching keys, and with a number of test clients making the requests that equals the #Clients value. A variety of requests can have a logical match with the Wait(Key)(#Clients) request. Requests that have a logical match with the Wait(Key)(#Clients) request include, but are not limited to a Wait(Key)(#Clients) request from another test client, and a WaitAsync(Key)(#Clients) request from another test client. The WaitAsync(Key)(#Clients) request will be further defined in association with FIG. 7.

If no matching wait group is identified at step 378, the MSS returns to idle at step 368 awaiting the next test client request. At step 380, when a matching wait group is detected, the MSS sends a notification of a matching wait group to each of the test clients associated with the wait requests that form the matching wait group, here test client A and test client B. At step 382, the requests that correspond to the matching wait group are deleted from the MSS.

When, at step 380, the notification of a matching wait group is sent to each test client, here test client A and test client B, that are in a suspended state of operation at steps 362 and 388 respectively, the test clients resume their operation as previously described.

With this particular arrangement, the program flow of a variety of test clients, here test client A and test client B, can be suspended until all such test clients reach a particular point in their respective programs flows.

While two test client programs 352, 356 are shown, it should be recognized the Wait instructions described above apply equally well to one or more test clients having associated computer programs.

Figure 7:
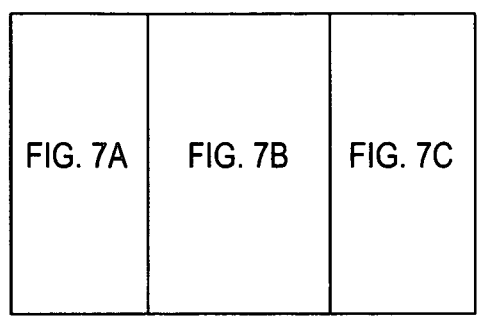
FIG. 7 is comprised of FIGS. 7A–7C, which taken together are a flow chart showing an illustrative example of another asynchronous transaction between the two test clients and the MSS.
Figure 7A:
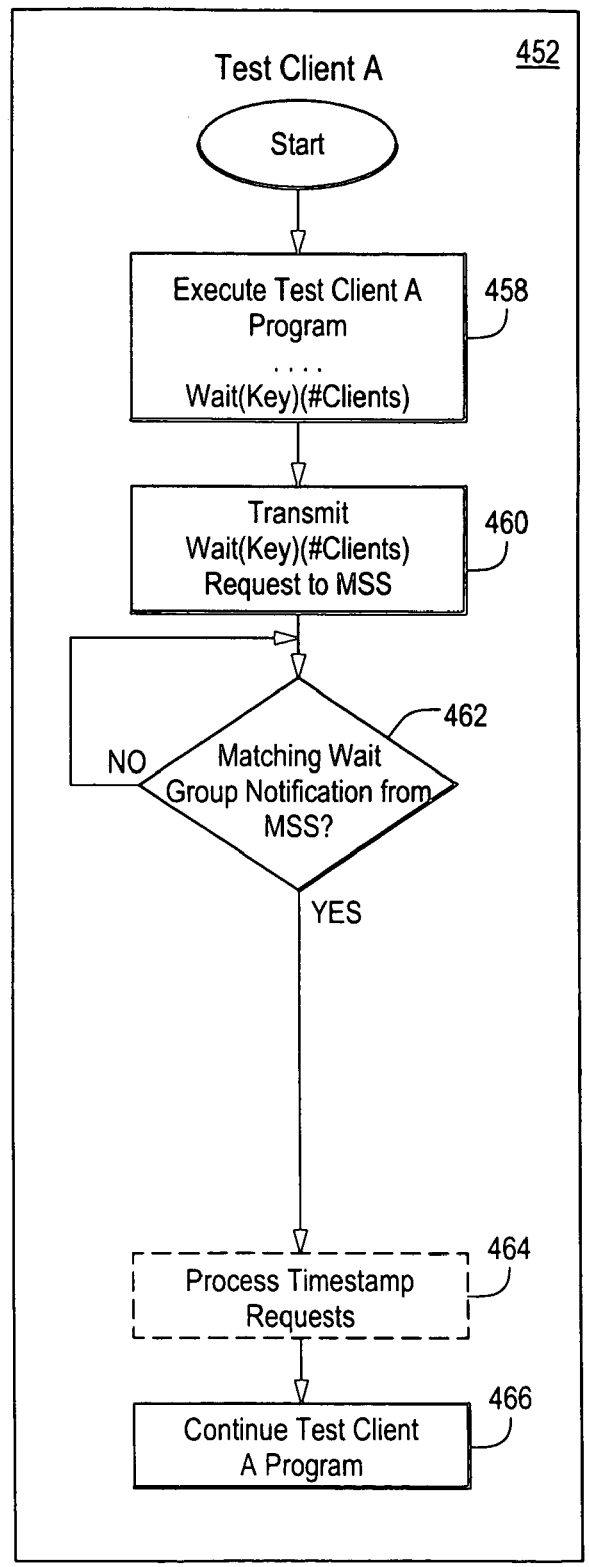
Figure 7B:
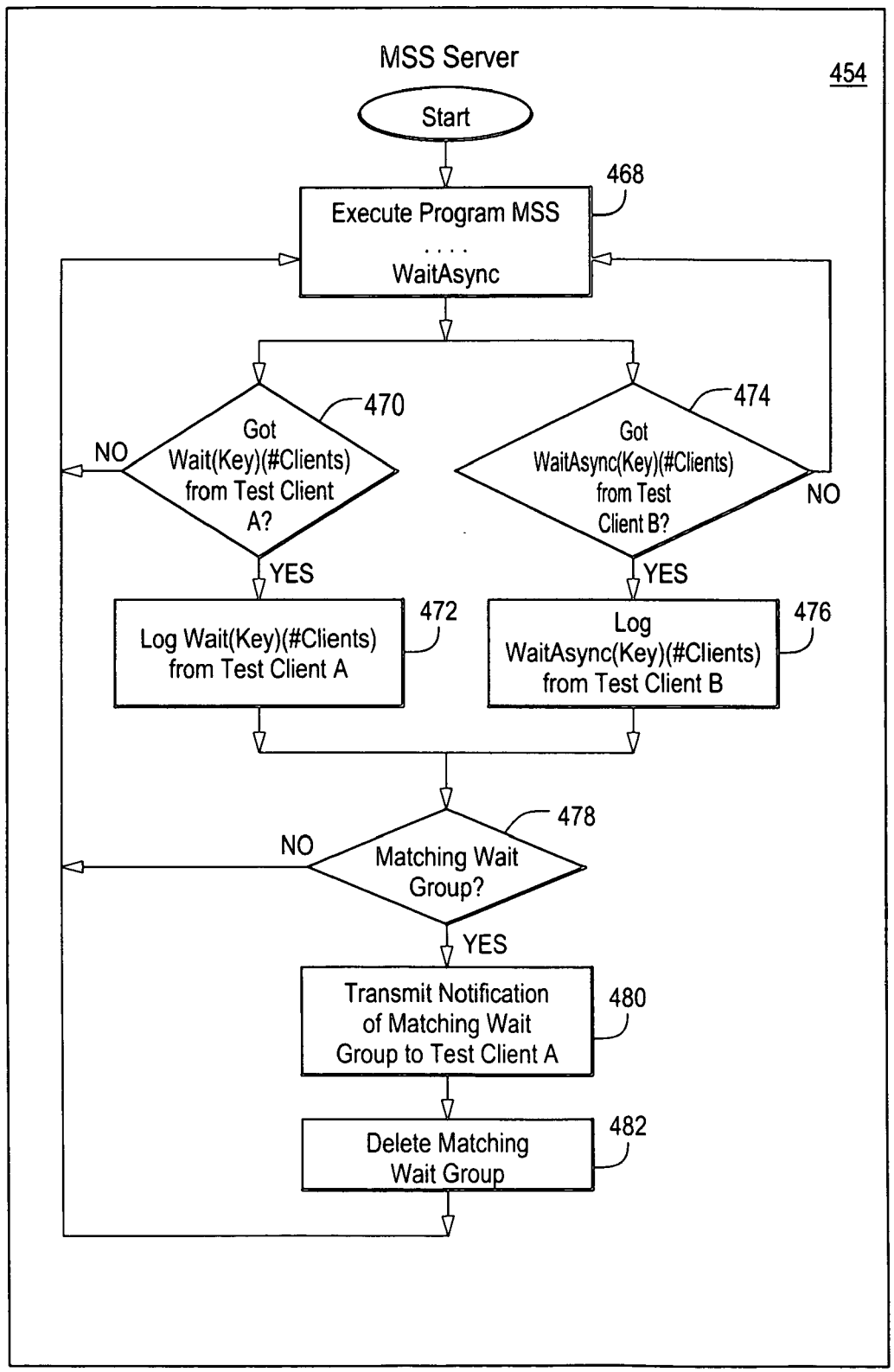
Figure 7C:
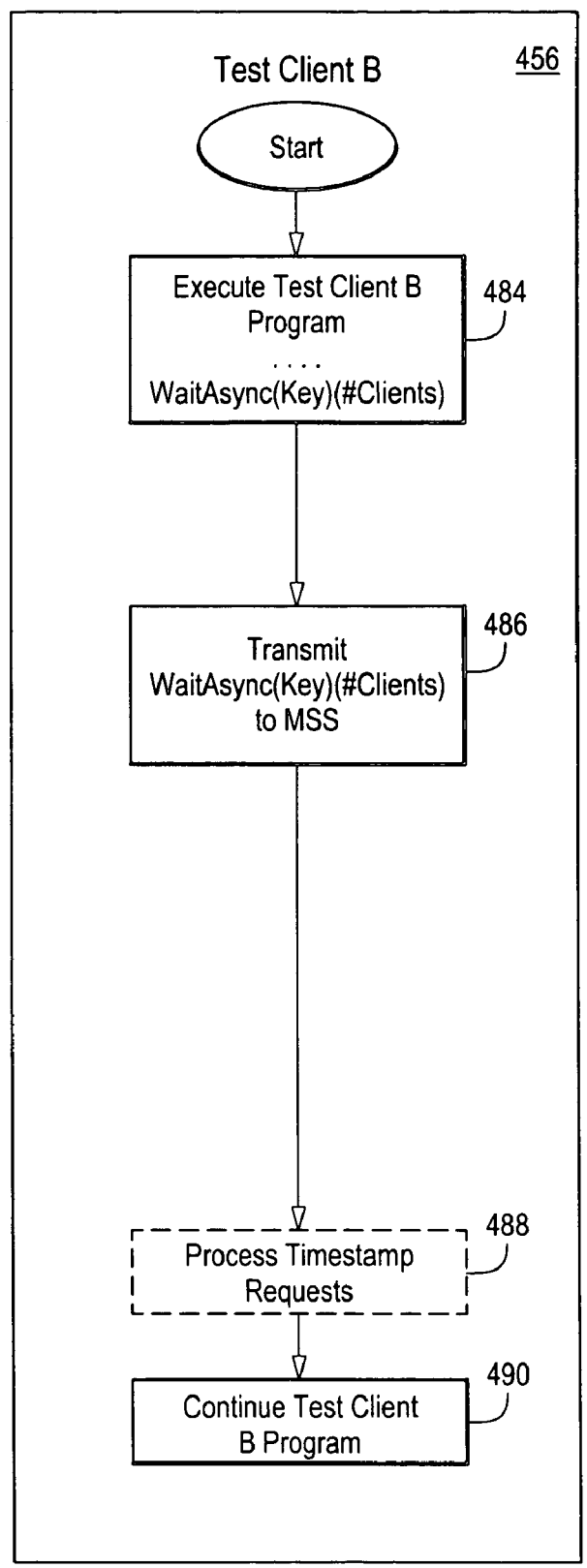

Referring now to FIG. 7, a flow chart 450 of an illustrative example of the multimedia synchronization system includes test client A functions 452, MSS functions 454, and test client B functions 456. The test client A functions 452 begin with execution of a test client A computer program at step 458.

It will be recognized that the test client A functions 452 are the same as those functions 352 of FIG. 6, and the test client A computer program proceeds through steps 458–466 in a fashion similar to that of steps 358–366 of FIG. 6. At step 466, the test client A program continues, and proceeds to other functions and requests as pre-determined by the computer programmer.

Continuing at the test client B functions 456, at step 384 the test client B program is executed. It should be recognized that the test client B program can begin asynchronously from the start of the test client A program at step 158.

Alternatively, one or more test client programs can be initiated synchronously by command from the MSS.

The test client B computer program proceeds until it encounters a WaitAsync(Key)(#Clients) command within the test client B program. The WaitAsync(Key)(#Clients) request is transmitted to the MSS at step 386. The WaitAsync(Key)(#Clients) request from test client B is distinguishable from the Wait(Key)(#Clients) from test client B of FIG. 6. Unlike that Wait(Key)(#Clients) request from test client B, the WaitAsync(Key)(#Clients) request from test client B does not result suspension of the test client B program. Instead, once the WaitAsync(Key)(#Clients) from test client B is transmitted to the MSS, the test client B program continues immediately to optional step 488. At optional step 488, timestamp information can be requested by test client B, as described above. The test client B program then continues at step 490.

It should be recognized that the test client A program functions 452 and the test client B program functions 456 can include any number of Wait(Key)(#Clients) and/or WaitAsync(Key)(#Clients) requests. Though here it is shown that test client A requests one Wait(Key)(#Clients) and test client B requests one WaitAsync(Key)(#Clients) any test client can request any number of Wait(Key)(#Clients) and/or WaitAsync(Key)(#Clients) having any #Clients value.

The MSS functions 454 begin at step 468, at which the MSS program begins. As described above, the MSS program can initialize the test client A functions 452 and the test client B functions 456. For example, the initialization can include an MSS timestamp request to/from each test client, so that their respective real time clocks can be coordinated.

At step 468, the MSS sits idle until a request is generated by a test client, here test client A or test client B. Upon receiving a request from a test client, the request is analyzed at steps 470 and 474. A variety of requests can be received by the MSS. For clarity, only two requests are shown in association with the MSS functions 454. Here, the Wait(Key)(#Clients) request and WaitAsync(Key)(#Clients) request, among a variety of requests that can be received by the MSS, is analyzed at steps 470 and 474 to determine if it is a Wait(Key)(#Clients) from test client A request at step 470 or a WaitAsync(Key)(#Clients) request from test client B at step 474. Other request types are similarly shown in association with FIGS. 4–6. If a Wait(Key)(#Clients) from test client A request is received by the MSS, the request is logged at step 472. At step 472, the MSS stores the request, the key value and the #Clients value that uniquely identify the request, and a first request timestamp corresponding to the time at which the request was received by the MSS. Conversely, if a WaitAsync(Key)(#Clients) from test client B request is received by the MSS, the request is logged at step 474. At step 474, the MSS stores the request, the key value and the #Clients value that uniquely identify the request, and a second request timestamp corresponding to the time at which the request was received by the MSS. If the request was neither Wait(Key)(#Clients) from test client A nor WaitAsync(Key)(#Clients) from test client B, the program returns to an idle conditions at step 468. Other requests described above in association with FIGS. 4–6 can also be analyzed by the MSS.

If either a Wait(Key)(#Clients) from test client A request or WaitAsync(Key)(#Clients) from test client B request was received and logged at steps 472 or 476, the process continues at step 478. At step 478, the MSS determines whether a request has been previously received that, in combination with the new request, generates a matching wait group. The matching wait group is described above. It should be remembered that a matching wait group can be fulfilled by requests having a logical match, with matching keys, and with a number of test clients that also match the #Clients value. A variety of requests can have a logical match with the Wait(Key)(#Clients) request. Requests that have a logical match with the Wait(Key)(#Clients) request include, but are not limited to a Wait(Key)(#Clients) request from another test client, and a WaitAsync(Key)(#Clients) request from another test client.

If no matching wait group is identified at step 478, the MSS returns to idle at step 468 awaiting the next test client request. At step 480, when a matching wait group is detected, the MSS sends a notification of the matching wait group to only test client A. It should be recognized that notification is sent only to a test client that has made a "synchronous" Wait(Key)(#Clients) request, i.e., test client A However, in an alternate embodiment, notification could be sent to both test client A and test client B. At step 482, the requests that correspond to the matching wait group are deleted from the MSS.

When, at step 480, the notification of the matching wait group is sent to the test clients, here test client A and test client B, test client A resumes program flow from the suspended state at step 462 as previously described.

With this particular arrangement, the program flow of a variety of test clients, here test client A only, can be suspended until one or more other test clients reach a particular point in their respective programs flows.

While particular test client requests have been shown in association with FIGS. 4–7, a variety of test client requests can be provided in accordance with this invention. For example, a Lock(Key) request and an UnLock(Key) request is also provided. A Lock(Key) request can be associated with a particular portion of software code by a first test client. When the Lock(Key) request is sent to the MSS, the MSS logs the request. If a Lock(Key) request with a matching key value has already been received by the MSS, from any test client including the first test client, the MSS notifies the first test client of a "lock match" and the first test client is caused to bypass the portion of software code associated with the Lock(Key) request. The Lock(Key) request is desirable to prevent two or more test clients from simultaneously executing test program code associated with the key value.

The UnLock(Key) request can be provided to remove a Lock(Key) request that has been logged by the MSS. Thus, the first test client, upon sending the Lock(key) request to the MSS will not be notified by the MSS of a matching lock and the first test client can perform the software code associated with the Lock(Key) request.

While two test client programs 452, 456 are shown, it should be recognized that the Wait, WaitAsync, Lock, and Unlock instructions described above apply equally well to one or more test clients having associated computer programs.

Figure 8:
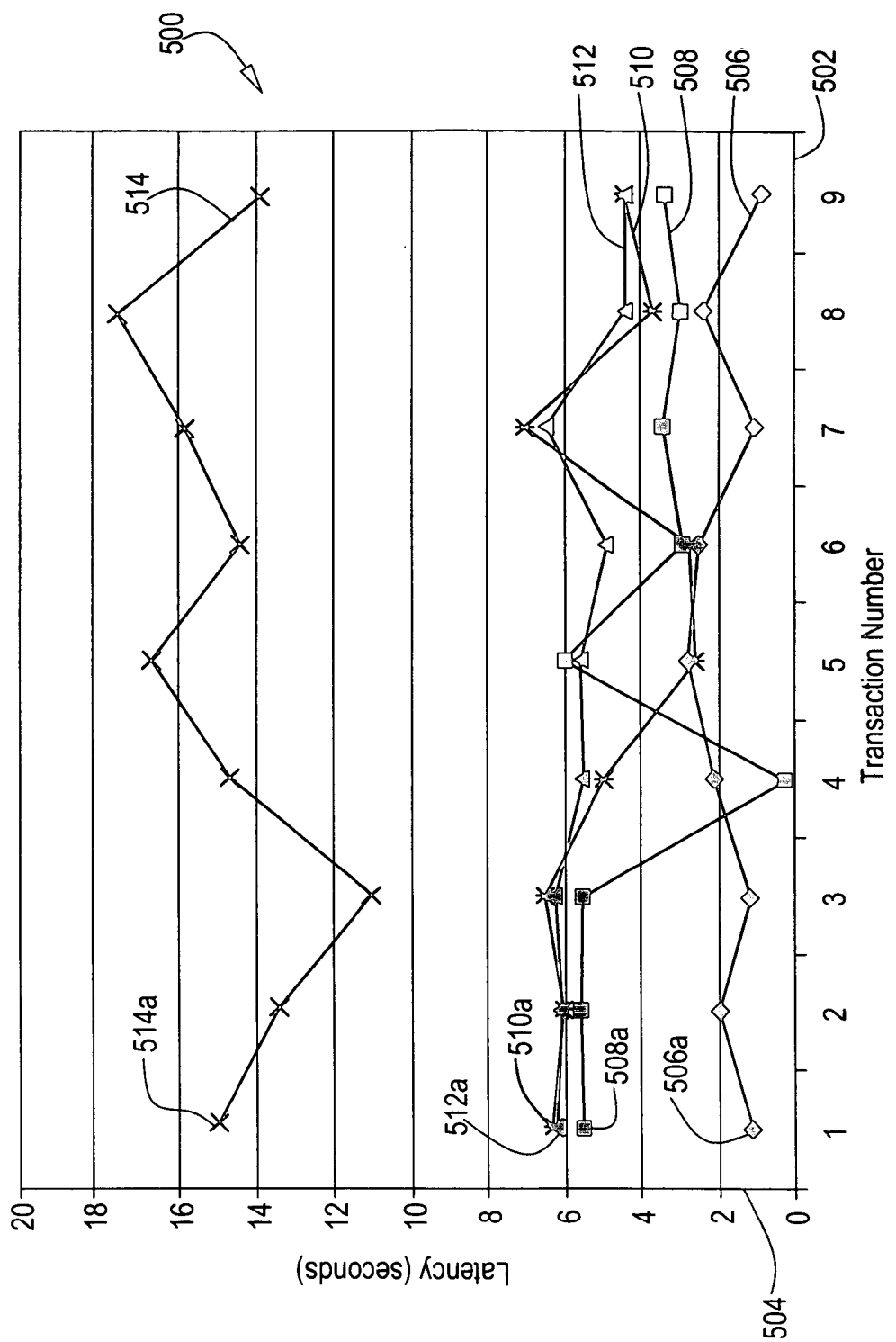
FIG. 8 is graph showing illustrative time latency data that can be obtained in accordance with the present invention.

Referring now to FIG. 8 in combination with FIG. 3, a graph 500 includes a scale 502 corresponding to a transaction number. Each such transaction corresponds to an action provided by a first virtual test system, and a contact center function and measurement thereof provided by a second virtual test system. The first virtual test system, for example, can be provided as a virtual telephone caller system 38, and the second virtual test system can be provided as a virtual agent computer system 42 as shown in FIG. 3. The graph 500 also includes a latency timescale 504 in units of seconds.

Though the virtual telephone caller system 38 and the virtual agent telephone system 40 are described below in association with the variety of time latency measurement, it should be recognized that time latency is controlled in part by the PBX/ACD 16 that queues both real and virtual telephone calls incoming to the contact center in order of precedence. Thus, telephone calls that may be generated by real telephone callers as part of the PSTN, (element 12 of FIG. 3), while the testing is ongoing, can effect the latency measurement by the virtual test systems 38, 40. This is the desired behavior, since the contact center latency values under real operational conditions are of most interest to the contact center designer and manager.

Curve 506 corresponds to nine latency measurements, each indicated by a diamond data point of which data point 506a is but one example. Referring to data point 506a as representative of all data points on curve 506, data point 506a corresponds to a time latency measurement equal to the time between the beginning of a simulated telephone call to the contact center and the time that the contact center answers the call. The telephone call can be generated by a virtual telephone caller system, for example the virtual telephone caller system 38 of FIG. 3, and the contact center can answer with a PBX/ACD and IVR system, for example PBX/ACD 16 and IVR 18 of FIG. 3. A time latency value of approximately one second is indicated. Upon answering the telephone call, the IVR 18 requests an input of caller identity information and the virtual telephone caller system 38 provides the caller identity information.

Curve 508 corresponds to nine latency measurements, each indicated by a square data point of which data point 508a is but one example. Referring to data point 508a as representative of all data points on curve 508, data point 508a corresponds to a time latency measurement equal to the time between input of caller identity information and the time that the contact center verifies the caller identity information within the database server, for example database server 32 of FIG. 3. A time latency value of approximately five seconds is indicated. Upon verifying the caller identity information, the contact center accesses additional information from the database server 32, including information about the last transaction performed by the identified telephone caller.

Curve 510 corresponds to nine latency measurements, each indicated by a star data point of which data point 510a is but one example. Referring to data point 510a as representative of all data points on curve 510, data point 510a corresponds to a time latency measurement equal to the time between the start of access of last transaction information and the time that the information is obtained from the database server 32. A time latency value of approximately six seconds is indicated. Upon accessing the last transaction information, the IVR 18 requests that the caller dial zero to connect to an agent, for example one of agents 20 of FIG. 3. Thereupon, the virtual telephone caller system 38 dials zero.

Curve 512 corresponds to nine latency measurements, each indicated by a triangular data point of which data point 512a is but one example. Referring to data point 512a as representative of all data points on curve 512, data point 512a corresponds to a time latency measurement equal to the time between the time at which the virtual telephone caller system 38 dials zero, and the time that the virtual agent telephone system 40 answers the telephone. Again, a time latency value of approximately six seconds is indicated.

Curve 514 corresponds to nine latency measurements, each indicated by an "x" data point of which data point 514a is but one example. Referring to data point 514a as representative of all data points on curve 512, data point 514a corresponds to a time latency measurement equal to the time between the time at which the virtual telephone caller system 38 dials zero, and the time at which the virtual agent computer system, for example virtual agent computer system 42 of FIG. 3, receives a screen pop. A time latency value of approximately fifteen seconds is indicated.

It should be recognized that the time latency values represented by data points 506a–514a are not cumulative; rather, they are independent. Two events having a first and a second latency value indicates that the combination of the two events must have a total time latency equal to the sum of the first and the second latency values.

The multimedia synchronization system of the present invention provides synchronization and matching of actions provided as input to the contact center with measurements of functions generated by the contact center. Furthermore, a variety of combinations of actions and functions can be synchronized. The system provides integrated and synchronized testing of a contact center, for which the testing can correspond to one or more of a variety of virtual test systems. In this way contact center performance measurements can be obtained to provided information to a contact center designer and manager.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer system comprising:
   a synchronization server for synchronizing the operation of one or more virtual test systems; and
   one or more test client computers coupled to the synchronization server, wherein respective ones of the one or more test client computers generate first requests and second requests to the synchronization server wherein the respective ones of the first requests and the respective ones of the second requests are logically related, to provide logically related requests wherein the respective ones of the first requests and the respective ones of the second requests are provided having identifier key values for associating respective ones of the logically related requests, and wherein the synchronization server controls the one or more test client computers to provide a measurement of one or more time latency values.

2. The computer system of claim 1, wherein respective ones of the one or more virtual test systems are coupled to the respective ones of the one or more test client computers and the one or more virtual test systems are coupled to a contact center associated with contact center functions; wherein:

the one or more virtual test systems include at least one of a virtual telephone caller system associated with virtual telephone caller actions, a virtual agent telephone system associated with virtual agent telephone actions, a virtual agent computer system associated with virtual agent computer actions, and a virtual web user system associated with virtual web user actions; and, respective ones of the first requests and respective ones of the second requests are associated with respective ones of the virtual telephone caller actions, respective ones of the virtual agent telephone actions, respective ones of the virtual agent computer actions and respective ones of the virtual web user actions.

3. The computer system of claim 1, wherein the respective ones of the first requests and the respective ones of the second requests are provided having number of clients values for further associating respective ones of the logically related requests.

4. The computer system of claim 1, wherein the time latency values correspond to at least one of a time latency value between respective ones of the virtual telephone caller actions, a time latency value between respective ones of the virtual agent telephone actions, a time latency value between respective ones of the virtual agent computer actions, a time latency value between respective ones of the virtual web user actions, a time latency value between respective ones of the virtual telephone caller actions and respective ones of the virtual agent telephone actions, a time latency value between respective ones of the virtual telephone caller actions and respective ones of the virtual agent computer actions, a time latency value between respective ones of the virtual telephone caller actions and respective ones of the virtual web user actions, a time latency value between respective ones of the virtual agent telephone actions and respective ones of the virtual agent computer actions, a time latency value between respective ones of the virtual agent telephone actions and respective ones of the virtual web user actions, a time latency value between respective ones of the virtual agent computer actions and respective ones of the virtual web user actions, a time latency value between respective ones of the virtual telephone caller actions and respective ones of the contact center functions, a time latency value between respective ones of the virtual agent telephone actions and respective ones of the contact center functions, a time latency value between respective ones of the virtual agent computer actions and respective ones of the contact center functions, a time latency value between respective ones of the virtual web user actions and respective ones of the contact center functions.

5. A synchronization method comprising:
generating first requests and second requests from one or more test client computers to a synchronization server, for synchronizing the operation of one or more virtual test systems logically relating respective ones of the first requests and respective ones of the second requests, to provide logically related requests;

associating respective ones of the logically related requests by relating identifier key values associated with the respective ones of the logically related requests; and controlling the one or more test client computers to provide a measurement of one or more time latency values.

6. The synchronization method of claim 5, further including:

generating at least one of virtual telephone caller actions with a virtual telephone caller system coupled to a respective one of the one or more test client computers, virtual agent telephone actions with a virtual agent telephone system coupled to a respective one of the one or more test client computers, virtual agent computer actions with a virtual agent computer system coupled to a respective one of the one or more test client computers, and virtual web user actions with a virtual web user system coupled to a respective one of the one or more test client computers; wherein:

the virtual telephone caller system, the virtual agent telephone system, the virtual agent computer system, and the virtual web user system are coupled to a contact center associated with contact center functions; and respective ones of the first requests and respective ones of the second requests are associated with respective ones of the virtual telephone caller actions, respective ones of the virtual agent telephone actions, respective ones of the virtual agent computer actions and respective ones of the virtual web user actions.

7. The synchronization method of claim 5, further including:

relating number of clients values associated with the respective ones of the first requests and the respective ones of the second requests, to further associate respective ones of the logically related requests.

8. The synchronization method of claim 5, wherein the time latency values correspond to at least one of a time latency value between respective ones of the virtual telephone caller actions, a time latency value between respective ones of the virtual agent telephone actions, a time latency value between respective ones of the virtual agent computer actions, a time latency value between respective ones of the virtual web user actions, a time latency value between respective ones of the virtual telephone caller actions and respective ones of the virtual agent telephone actions, a time latency value between respective ones of the virtual telephone caller actions and respective ones of the virtual agent computer actions, a time latency value between respective ones of the virtual telephone caller actions and respective ones of the virtual web user actions, a time latency value between respective ones of the virtual agent telephone actions and respective ones of the virtual agent computer actions, a time latency value between respective ones of the virtual agent telephone actions and respective ones of the virtual web user actions, a time latency value between respective ones of the virtual agent computer actions and respective ones of the virtual web user actions, a time latency value between respective ones of the virtual telephone caller actions and respective ones of the contact center functions, a time latency value between respective ones of the virtual agent telephone actions and respective ones of the contact center functions, a time latency value between respective ones of the virtual agent computer actions and respective ones of the contact center functions, and a time latency value between respective ones of the virtual web user actions and respective ones of the contact center functions.

9. A synchronization method, including:
generating first requests and second requests from one or more test client computers to a synchronization server;

associating a portion of a first software program associated with a first respective one of the one or more test client computers with a respective one of the first requests having a first key value;

associating a portion of a second software program associated with a second respective one of the one or more test client computers with a respective one of the second requests having the first key value;

transmitting the respective one of the first requests to the synchronization server;

transmitting the respective one of the second requests to the synchronization server;

identifying a matching request pair as the respective one of the first requests having the first key value in combination with the respective one of the second requests having the first key value;

transmitting a notification of the matching pair from the synchronization server to the first respective one of the one or more test client computers and to the second respective one of the one or more test client computers; and bypassing the portion of the first software program if the notification is received by the first respective one of the one or more test client computers.

10. A synchronization method, including:

generating first requests and second requests from one or more test client computers to a synchronization server;

associating a portion of a first software program associated with a first respective one of the one or more test client computers with a respective one of the first requests having a first key value and a first number of clients value;

associating a portion of a second software program associated with a second respective one of the one or more test client computers with a respective one of the second requests having the first key value and the first number of clients value;

transmitting the first one of the first requests to the synchronization server;

transmitting the respective one of the second requests to the synchronization server;

identifying a matching request pair as the respective one of the first requests having the first key value and the first number of clients value in combination with the respective one of the second requests having the first key value and the first number of clients value;

transmitting a notification of the matching pair from the synchronization server to the first respective one of the one or more test client computers and to the second respective one of the one or more test client computers; and pausing execution of the first software program at the portion of the first software program if the notification is received by the first respective one of the one or more test client computers.

11. A computer program product comprising a computer usable medium having computer readable code thereon for synchronizing one or more virtual test systems, including program code comprising:

instructions for generating first requests and second requests from one or more test client computers to a synchronization server;

instructions for logically relating respective ones of the first requests and respective ones of the second requests, to provide logically related requests;

instructions for associating respective ones of the logically related requests by relating identifier key values associated with the respective ones of the logically related requests; and instructions for controlling the one or more test client computers to provide a measurement of one or more time latency values.

12. The computer program product of claim 11, including:

instructions for generating at least one of virtual telephone caller actions with a virtual telephone caller system coupled to a respective one of the one or more test client computers, virtual agent telephone actions with a virtual agent telephone system coupled to a respective one of the one or more test client computers, virtual agent computer actions with a virtual agent computer system coupled to a respective one of the one or more test client computers, and virtual web user actions with a virtual web user system coupled to a respective one of the one or more test client computers; wherein:

the virtual telephone caller system, the virtual agent telephone system, the virtual agent computer system, and the virtual web user system are coupled to a contact center associated with contact center functions; and respective ones of the first requests and respective ones of the second requests are associated with respective ones of the virtual telephone caller actions, respective ones of the virtual agent telephone actions, respective ones of the virtual agent computer actions and respective ones of the virtual web user actions.

13. The computer program product of claim 11, further including:

instructions for relating number of clients values associated with the respective ones of the first requests and the respective ones of the second requests, to further associate respective ones of the logically related requests.

14. The computer program product of claim 11, wherein the time latency values correspond to at least one of a time latency value between respective ones of the virtual telephone caller actions, a time latency value between respective ones of the virtual agent telephone actions, a time latency value between respective ones of the virtual agent computer actions, a time latency value between respective ones of the virtual web user actions, a time latency value between respective ones of the virtual telephone caller actions and respective ones of the virtual agent telephone actions, a time latency value between respective ones of the virtual telephone caller actions and respective ones of the virtual agent computer actions, a time latency value between respective ones of the virtual telephone caller actions and respective ones of the virtual web user actions, a time latency value between respective ones of the virtual agent telephone actions and respective ones of the virtual agent computer actions, a time latency value between respective ones of the virtual agent telephone actions and respective ones of the virtual web user actions, a time latency value between respective ones of the virtual agent computer actions and respective ones of the virtual web user actions, a time latency value between respective ones of the virtual telephone caller actions and respective ones of the contact center functions, a time latency value between respective ones of the virtual agent telephone actions and respective ones of the contact center functions, a time latency value between respective ones of the virtual agent computer actions and respective ones of the contact center functions, and a time latency value between respective ones of the virtual web user actions and respective ones of the contact center functions.

15. A computer program product comprising a computer usable medium having computer readable code thereon for synchronizing one or more test client computers, including program code comprising:
  instructions for generating first requests and second requests from one or more test client computers to a synchronization server;
  instructions for associating a portion of a first software program associated with a first respective one of the one or more test client computers with a respective one of the first requests having a first key value;
  instructions for associating a portion of a second software program associated with a second respective one of the one or more test client computers with a respective one of the second requests having the first key value;
  instructions for transmitting the respective one of the first requests to the synchronization server;
  instructions for transmitting the respective one of the second requests to the synchronization server;
  instructions for identifying a matching request pair as the respective one of the first requests having the first key value in combination with the respective one of the second requests having the first key value;
  instructions for transmitting a notification of the matching pair from the synchronization server to the first respective one of the one or more test client computers and to the second respective one of the one or more test client computers; and
  instructions for bypassing the portion of the first software program if the notification is received by the first respective one of the one or more test client computers.

16. A computer program product comprising a computer usable medium having computer readable code thereon for synchronizing one or more test client computers, including program code comprising:
  instructions for generating first requests and second requests from one or more test client computers to a synchronization server;
  instructions for associating a portion of a first software program associated with a first respective one of the one or more test client computers with a respective one of the first requests having a first key value and a first number of clients value;
  instructions for associating a portion of a second software program associated with a second respective one of the one or more test client computers with a respective one of the second requests having the first key value and the first number of clients value;
  instructions for transmitting the first respective one of the first requests to the synchronization server;
  instructions for transmitting the respective one of the second test client requests to the synchronization server;
  instructions for identifying a matching request pair as the respective one of the first requests having the first key value and the first number of clients value in combination with the respective one of the second requests having the first key value and the first number of clients value;
  instructions for transmitting a notification of the matching pair from the synchronization server to the first respective one of the one or more test client computers and to the second respective one of the one or more test client computers; and
  instructions for pausing execution of the first software program at the portion of the first software program if the notification is received by the first respective one of the one or more test client computers.

17. A method for testing a contact center, comprising:
  providing a first communication associated with a first media to the contact center with a first virtual test system;
  providing a second communication associated with a second media to the contact center with a second virtual test system;
  relating a portion of the first communication provided by the first virtual test system with a portion of the second communication provided by the second virtual test system;
  providing the portion of the first communication to a first test client computer;
  providing the portion of the second communication to a second test client computer;
  providing a third communication associated with the portion of the first communication to a multimedia synchronization server;
  providing a fourth communication associated with the portion of the second communication to the multimedia synchronization server; and
  synchronizing the first test client computer with the second test client computer in accordance with the third and fourth communications.

18. The method of claim 17, wherein the first media and the second media are the same type of media.

19. The method of claim 17, wherein the first media and the second media are different types of media.

20. The method of claim 17, wherein the first virtual test system is a selected one of a virtual telephone caller system, a virtual web user system, a virtual agent telephone system, and a virtual agent computer system.

21. The method of claim 17, wherein the second virtual test system is a selected one of a virtual telephone caller system, a virtual web user system, a virtual agent telephone system, and a virtual agent computer system.

22. A computer program product comprising a computer usable medium having computer readable code thereon, comprising instructions for:
  providing a first communication associated with a first media to Ha contact center with a first virtual test system;
  providing a second communication associated with a second media to the contact center with a second virtual test system;
  relating a portion of the first communication provided by the first virtual test system with a portion of the second communication provided by the second virtual test system;
  providing the portion of the first communication to a first test client computer;
  providing the portion of the second communication to a second test client computer;
  providing a third communication associated with the portion of the first communication to a multimedia synchronization server;
  providing a fourth communication associated with the portion of the second communication to the multimedia synchronization server; and
  synchronizing the first test client computer with the second test client computer in accordance with the third and fourth communications.

23. The computer program product of claim 22, wherein the first media and the second media are the same type of media.

24. The computer program product of claim 22, wherein the first media and the second media are different types of media.

25. The computer program product of claim 22, wherein the first virtual test system is a selected one of a virtual telephone caller system, a virtual web user system, a virtual agent telephone system, and a virtual agent computer system.

26. The computer program product of claim 22, wherein the second virtual test system is a selected one of a virtual telephone caller system, a virtual web user system, a virtual agent telephone system, and a virtual agent computer system.

* * * * *

UNITED STATES PATENT AND TRADEMARK OFFICE
CERTIFICATE OF CORRECTION

PATENT NO. : 6,944,799 B1  Page 1 of 1
DATED : September 13, 2005
INVENTOR(S) : Albert Robinson Seeley, Steven Todd Sigel and Douglas Carter Williams It is certified that error appears in the above-identified patent and that said Letters Patent is hereby corrected as shown below:

<u>Column 28,</u>
Line 43, "Ha" should read -- a --.

Signed and Sealed this

Thirteenth Day of December, 2005

JON W. DUDAS
*Director of the United States Patent and Trademark Office*